(12) United States Patent
Powell et al.

(10) Patent No.: US 9,797,022 B2
(45) Date of Patent: Oct. 24, 2017

(54) METHODS AND SYSTEMS FOR PROCESSING A REACTION PRODUCT MIXTURE OF CELLULOSIC BIOMASS MATERIAL

(71) Applicant: SHELL OIL COMPANY, Houston, TX (US)

(72) Inventors: Joseph Broun Powell, Houston, TX (US); Molly Gilchrest, Houston, TX (US); Lamar Lane Joffrion, Sugar Land, TX (US); Kimberly Ann Johnson, Richmond, TX (US); Juben Nemchand Chheda, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 463 days.

(21) Appl. No.: 14/485,859

(22) Filed: Sep. 15, 2014

(65) Prior Publication Data

US 2015/0176092 A1    Jun. 25, 2015

Related U.S. Application Data

(60) Provisional application No. 61/919,259, filed on Dec. 20, 2013.

(51) Int. Cl.
  *C13K 1/04*    (2006.01)
  *C10G 1/06*    (2006.01)
  *B01D 3/06*    (2006.01)

(52) U.S. Cl.
  CPC ............... *C13K 1/04* (2013.01); *C10G 1/065* (2013.01); *B01D 3/06* (2013.01); *C10G 2300/1014* (2013.01); *C10G 2300/4075* (2013.01); *Y02P 30/20* (2015.11)

(58) Field of Classification Search
  CPC ............ C10G 1/065; C10G 2300/1014; C10G 2300/4075; Y02P 30/20; B01D 3/06
  See application file for complete search history.

(56) References Cited

U.S. PATENT DOCUMENTS

| 5,715,763 | A | 2/1998 | Fornetti et al. |
| 2003/0192810 | A1 | 10/2003 | Annesley et al. |
| 2010/0236988 | A1 | 9/2010 | Gabrielov et al. |
| 2011/0154721 | A1 | 6/2011 | Chheda et al. |
| 2012/0152836 | A1 | 6/2012 | Powell et al. |
| 2012/0156743 | A1 | 6/2012 | Powell et al. |
| 2012/0282465 | A1 | 11/2012 | Kadam et al. |

(Continued)

FOREIGN PATENT DOCUMENTS

| CN | 102239186 | 11/2011 |
| WO | WO03087267 | 10/2003 |
| WO | 2013066808 | 5/2013 |

OTHER PUBLICATIONS

International Written Opinion dated Dec. 1, 2014 of PCT/US2014/055303 filed Sep. 12, 2014.

*Primary Examiner* — David A Reifsnyder

(57) ABSTRACT

Processing of a reaction product mixture containing at least one volatile organic compound as well as lignin, lignin derived compounds, and/or unextracted cellulose and hemicellulose using a recovery system comprising at least two flashers or at least one flasher and at least two reboilers. In a particular embodiment, the reaction product mixture comes from reactions involving deconstruction (or digestion) of biomass, particularly cellulosic biomass which contains various polysaccharides (e.g., carbohydrates) and lignin.

18 Claims, 4 Drawing Sheets

(56) References Cited

U.S. PATENT DOCUMENTS

| | | |
|---|---|---|
| 2012/0317872 A1 | 12/2012 | Powell et al. |
| 2013/0109896 A1 | 5/2013 | Powell et al. |
| 2013/0145683 A1 | 6/2013 | Freel et al. |
| 2014/0000154 A1 | 1/2014 | Powell |
| 2014/0117276 A1 | 5/2014 | Powell et al. |

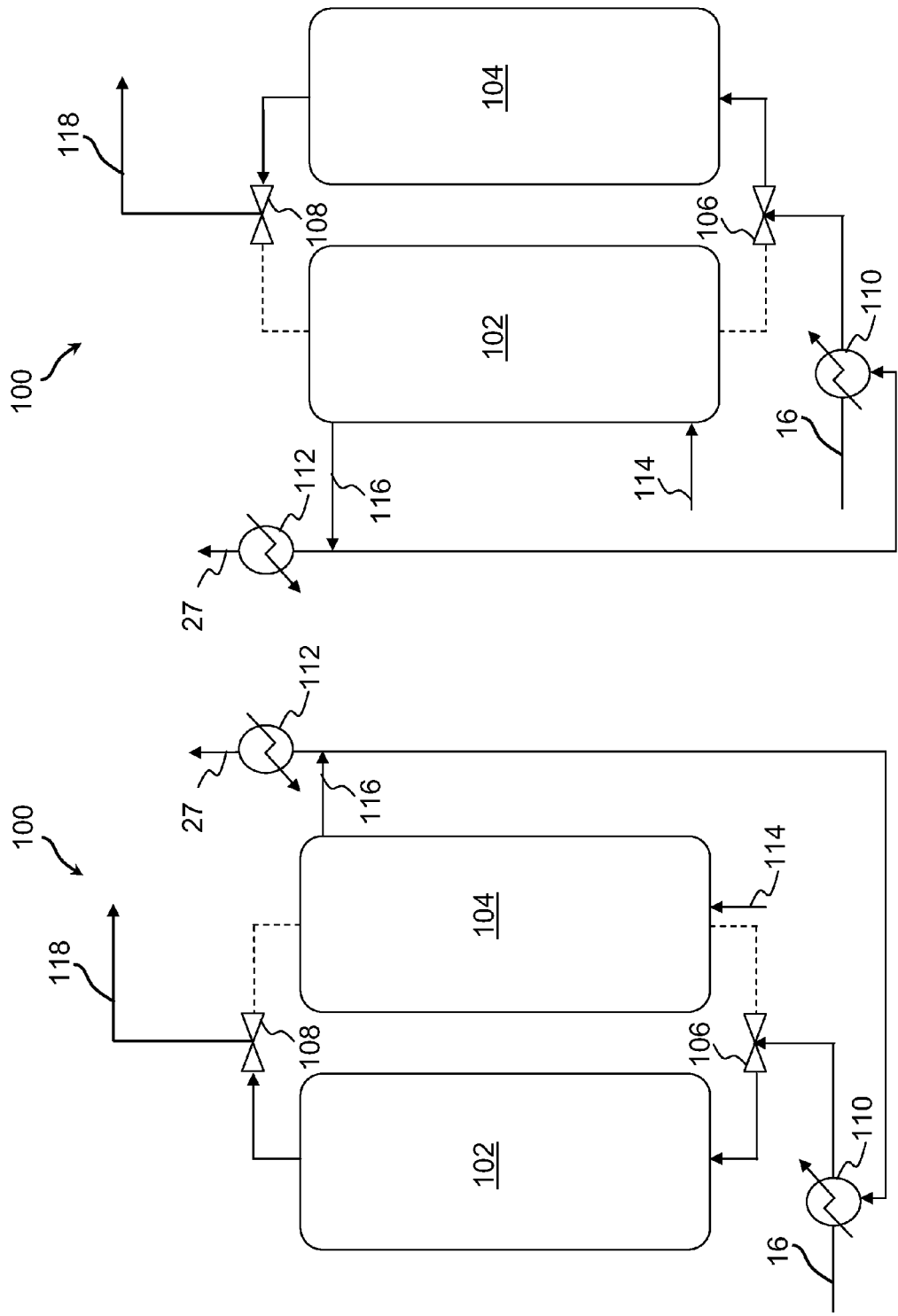

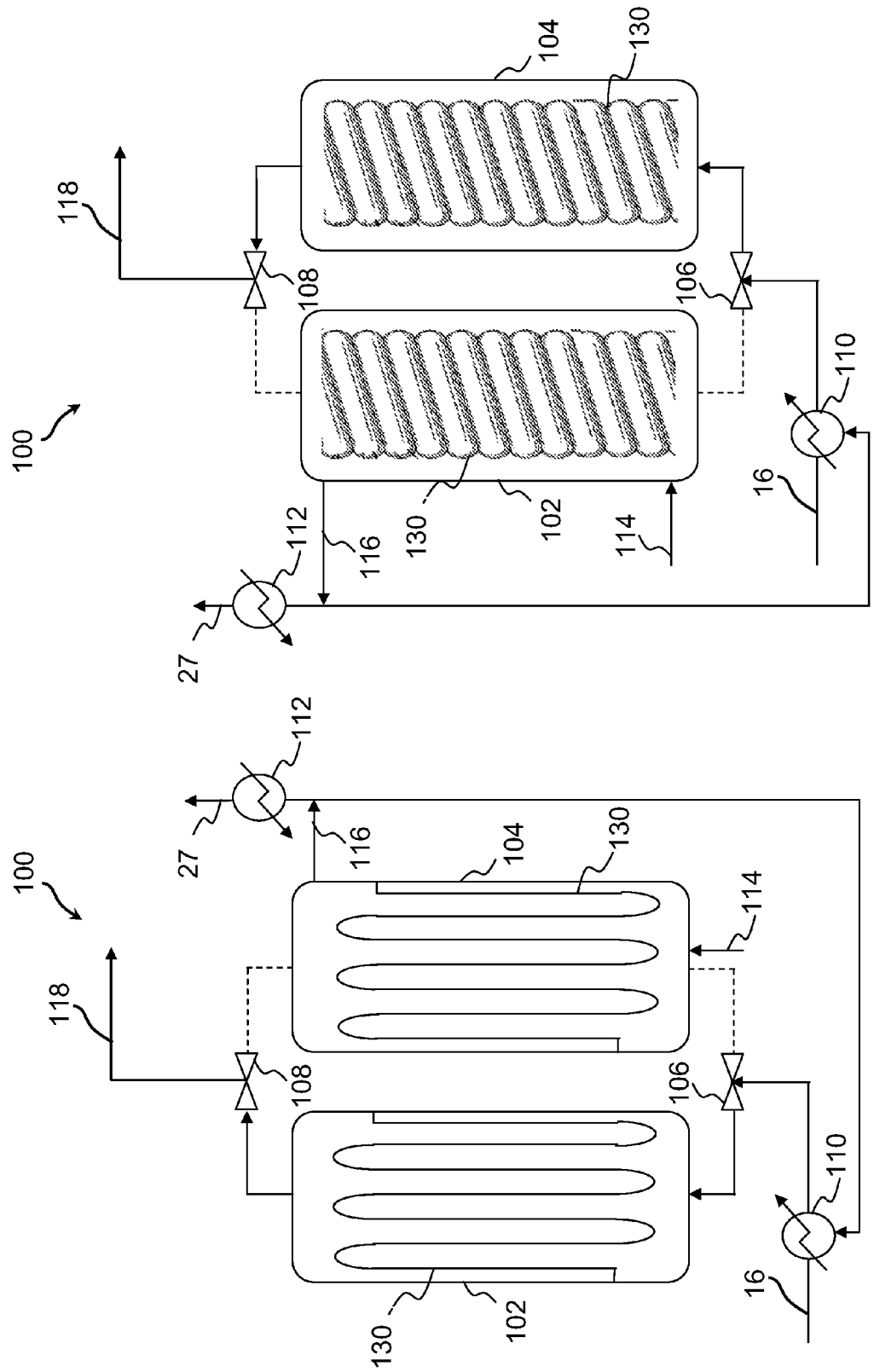

METHODS AND SYSTEMS FOR PROCESSING A REACTION PRODUCT MIXTURE OF CELLULOSIC BIOMASS MATERIAL

RELATED APPLICATION

This application claims priority to U.S. Provisional Application No. 61/919,259, filed on Dec. 20, 2013, the disclosure of which is incorporated herein by reference in its entirety.

TECHNICAL FIELD

The present disclosure generally relates to methods and systems for processing a reaction product mixture of a cellulosic biomass material.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

A number of substances of commercial significance may be produced from natural sources, including biomass. Cellulosic biomass may be particularly suitable in this regard due to the versatility of the abundant carbohydrates found therein in various forms. As used herein, the term "cellulosic biomass" refers to a living or formerly living biological material that contains cellulose. The lignocellulosic material found in the cell walls of plants is one of the world's largest sources of carbohydrates. Materials commonly produced from cellulosic biomass may include, for example, paper and pulpwood via partial digestion, biofuels, including bioethanol by fermentation.

Development of fossil fuel alternatives derived from renewable resources have received recent attention. Cellulosic biomass has garnered particular attention in this regard due to its abundance and the versatility of the various constituents found therein, particularly cellulose and other carbohydrates. Conversion of cellulosic biomass into fuel blends and other materials typically involve extraction of cellulose and other complex carbohydrates and transformation into simpler organic molecules for further processing, including digestion processes. The processing of the cellulose biomass typically produces an intermediate liquor that contains a mixture of products, including desirable organic molecules, as well as other compounds such as lignin and/or other related products. The desirable organic molecules are typically separated for further reactions to produce fuels while other components are handled separately.

There are existing methods to process the more challenging components of the intermediate liquor, which typically include lignin and/or other related products. One typical method uses solvents or other chemicals. In such a process, complex equipment is typically required and is expensive to operate because of the solvent or chemical usage. Further, separation and filtration of these other compounds, which typically include lignin and/or other related products, following solvent removal typically create engineering issues in the transportation of these other components to where they can be disposed, which is typically a burning facility. In other existing processes, the solid conversion of lignocellulosic biomass in pre-treatment (fractionation) and cellulose hydrolysis requires high temperatures and appropriate solvation properties to fully or partially solubilize lignin and/or related products present. Upon cooling, certain lignin and/or related compounds precipitate from solution. The particle size of the recovered lignin and/or related products may be variable and too large for efficient burning, thus requiring a separate pulverizing step. Furthermore, as the mixture containing lignin and/or related compounds in solution cools, it becomes sticky (typically in the glass transition temperature range of lignin and/or related products, which is about 100° C. under ambient pressure) and tends to foul the process equipment to the point of making the process inoperable.

As evidenced by the foregoing, the efficient processing of a reaction product mixture of cellulosic biomass is a complex problem that presents immense engineering challenges. Embodiments provided by the present disclosure address these challenges and provide related advantages as well.

SUMMARY

According to one aspect, the present disclosure provides a system comprising a digestion unit adapted to generate a digested product comprising at least one soluble carbohydrate from a cellulosic biomass material; a separation zone adapted to separate the digested product into a bottom fraction and an overhead fraction. The bottom fraction comprises (i) at least one compound having a separation point having a temperature in a range of about 100 to 600 degrees C. and a pressure of about atmospheric pressure, and (ii) one or more volatile organic compounds. The system further comprises a recovery unit comprising a first flasher coupled to the separation zone to receive at least a portion of the bottom fraction; and a second flasher coupled to the separation zone to receive at least another portion of the bottom fraction; where the recovery unit is configured to operate one of the first and second flashers to vaporize at least one volatile organic compound in the bottom fraction while the other flasher is in standby mode. In one embodiment, the bottom fraction comprises at least one of lignin, a lignin-derived compound, unextracted cellulose, unextracted hemicellulose, a caramelan, and any combination thereof.

In one embodiment, the system further comprises a processing zone coupled to the separation zone, the processing zone configured to convert at least a portion of a plurality of hydrocarbon and oxygenated hydrocarbon molecules in the overhead fraction to a product stream comprising a higher hydrocarbon. In one embodiment, an outlet of the recovery unit adapted to discharge at least a portion of the overhead product is coupled to an inlet of the processing zone.

In another embodiment, the system further comprises a heating component adapted to heat at least a portion of the bottom fraction prior to the bottom fraction entering the flasher in operation. In one embodiment, at least one flasher comprises a conduit adapted to circulate a heat exchange medium. In one embodiment, the overhead product comprises at least one oxygenated hydrocarbon molecule.

In another embodiment, the system further comprises a steam generator adapted to generate steam using at least a portion of thermal energy generated by combustion of a portion of the bottom fraction in the flasher in standby mode. In one embodiment, the bottom fraction comprises a compound having a separation point having a temperature in a range of about 100 to 500 degrees C. and a pressure in a range of about 1 to 100 Torr.

In another embodiment, the system further comprises a hydrocatalytic system disposed between the digestion unit and the separation zone. In one embodiment, the flasher in operation is configured to apply a temperature in a range of about 100 to 600 degrees C. and a pressure in a range of 0.01 to 250 psi to the bottom fraction.

According to another aspect, the present disclosure provides a method comprising: providing a biomass feedstock containing cellulose and water; digesting at least a portion of the biomass feedstock to generate a digested product comprising at least one soluble carbohydrate; separating the digested product into at least a bottom fraction and an overhead fraction. The bottom fraction comprises (i) at least one compound having a separation point having a temperature in a range of about 100 to 600 degrees C. and a pressure of about atmospheric pressure and (ii) one or more volatile organic compounds. The method further comprises vaporizing at least one volatile organic compound from the bottom fraction in a first flasher; depositing the at least one compound having a separation point having a temperature in a range of about 100 to 600 degrees C. and a pressure of about atmospheric pressure on a surface of the first flasher; placing the first flasher in standby mode; vaporizing at least one volatile organic compound from the bottom fraction in a second flasher; and combusting the deposited at least one compound in the first flasher. In one embodiment, the bottom fraction comprises at least one of lignin, a lignin-derived compound, unextracted cellulose, unextracted hemicellulose, a caramelan, and any combination thereof.

Other features of embodiments of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

FIGS. 2A and 2B are schematics of a first exemplary embodiment of a recovery unit according to aspects provided by the present disclosure.

FIGS. 3A and 3B are schematics of a second exemplary embodiment of a recovery unit according to aspects provided by the present disclosure.

DETAILED DESCRIPTION

Figure 1:
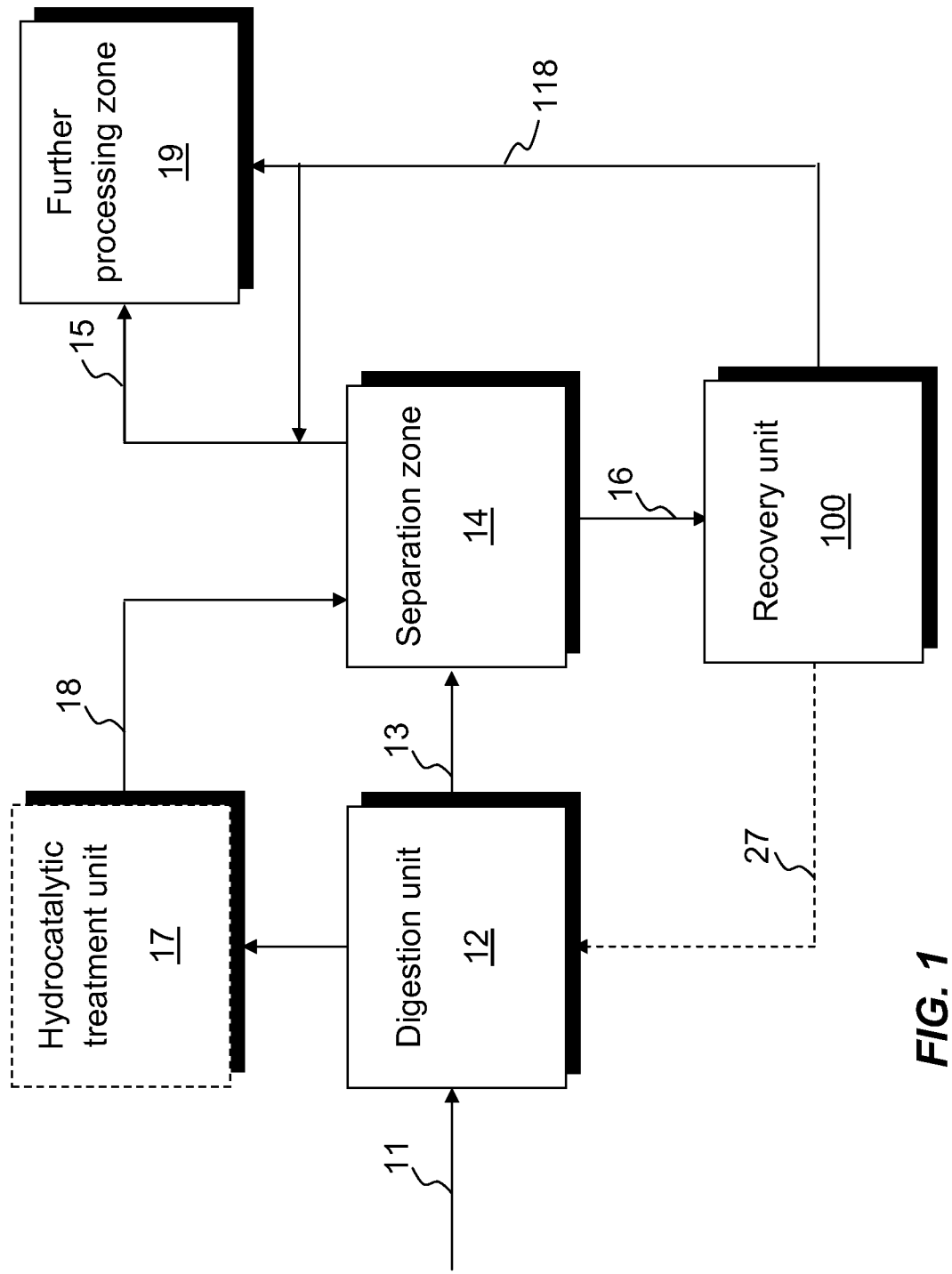
FIG. 1 is a schematic of an exemplary embodiment of a recovery system according to aspects provided by the present disclosure.

Various embodiments described in this disclosure provide for systems and methods for processing of a reaction product mixture containing volatile organic compounds as well as at least one of lignin, a lignin-derived compound, unextracted cellulose, unextracted hemicellulose, a caramelan, and any combination thereof. In one embodiment, the system comprises at least two flashers, at least one of which is in operation mode while at least another flasher is in stand-by mode. The flasher in operation can be used to vaporize volatile organic compounds in the reaction product mixture that can be collected for further processing. The portion of the reaction product mixture combusted is preferably a bottom fraction of the reaction product mixture. In one embodiment, during operation, at least a portion of lignin, lignin-derived compounds, and/or and other high molecular weight carbonaceous compounds derived from adverse reactions of carbohydrates, sugars, and lignin-derived species contained in the bottom fraction is deposited on an interior surface the flasher in operation. As the deposited material accumulates, the flasher's ability to flash volatile organic compounds from the reaction product mixture decreases. When the flasher's capability falls below a certain level of performance, the less efficient flasher loaded with deposited material can be replaced with the flasher on stand-by so flashing operations can continue. The level of performance can be selected by one of ordinary skill in the art. The deposited material can be removed from the now off-line flasher containing the deposited material by adding a fluid containing oxygen to combust the deposited material in-situ. This allows for continued flashing of the reaction product mixture without significant delay waiting for removal of the deposited material, which can include at least one of lignin, a lignin-derived compound, unextracted cellulose, unextracted hemicellulose, a caramelan, and any combination thereof. As used herein, the terms "combust," "combustion" and "combustible" refer to complete or substantially complete combustion involving an oxidation process that converts a carbonaceous material to a product mixture consisting substantially of carbon dioxide and steam. In another embodiment, one or more flashers can further comprise one or more conduits configured to circulate a heat exchange medium to allow for further control of the flashing process where the reaction product can be additionally heated or cooled in the flasher during operation to achieve vaporization of desired volatile organic compounds.

In yet another embodiment, the system comprises a flasher coupled to at least two reboilers, at least one in operation and at least one other on stand-by. The heat to operate the flasher is provided by the at least one reboiler in operation or on-line. In one embodiment, during operation, at least a portion of lignin, lignin-derived compounds, and/or and other high molecular weight carbonaceous compounds derived from adverse reactions of carbohydrates, sugars, and lignin-derived species contained in the bottom fraction is deposited on an interior surface of the reboiler. As the deposited material accumulates, the reboiler's heat transfer capability decreases. When the reboiler's capability falls below a certain level of performance, the less efficient reboiler containing buildup of the deposited material can be replaced with the reboiler on stand-by or off-line so flashing operations can continue. The level of performance can be selected by one of ordinary skill in the art. The deposited material can be removed from the now off-line reboiler through a burn off by introduction of an oxygen containing fluid and combustion, which may be controlled. Embodiments described by the present disclosure provide for a recovery system with multi-, and particularly dual-, flashing capabilities that allows for recovery of volatile organic compounds from a fraction of a reaction product mixture comprising at least one of lignin, a lignin-derived compound, unextracted cellulose, unextracted hemicellulose, a caramelan, and any combination thereof, and processing of certain materials in that fraction.

In one embodiment, at least one flasher can further include one or more packer elements preferably comprising a heat resistant material, such as ceramic, metal, or inorganic oxide material, to increase the surface area onto which lignin, and/or related compounds such as lignin-derived compounds, and/or other high molecular weight carbonaceous compounds can be deposited during the flashing operation. A heat resistant material is preferred to withstand combustion conditions in such embodiments. The one or more packer elements may comprise any suitable material known to those skilled in the art.

The reaction product mixture can come from any suitable source. In a particular embodiment, the reaction product mixture comes from reactions involving deconstruction (or digestion) of biomass, particularly cellulosic biomass which contains various polysaccharides (e.g., carbohydrates) and lignin. The term "cellulosic biomass" refers at least to a living or formerly living biological material that contains cellulose. Applicable reactions include hydrolysis reactions that convert or break down certain larger carbohydrate compounds to more desired compounds for subsequent processing. Exemplary reactions include digestion, pulping solvation, and thermocatalytic conversion of cellulosic biomass.

Various materials can be produced from cellulosic biomass material, including but not limited to biofuels. Production of biofuels often require digestion of the cellulosic biomass, including cellulose and other complex carbohydrates, to generate soluble carbohydrates for further processing into the desired product. The term "soluble carbohydrates" refers at least to monosaccharides or polysaccharides that become solubilized in a digestion process. Subsequent processing of the soluble carbohydrates typically produces a fluid that contains desirable organic molecules, such as volatile organic compounds, as well as lignin and other by-products. The desirable organic molecules are recovered for further processing to produce the final product, such as higher molecular weight hydrocarbons. In certain digestion processes, lignin and/or other related products in a reaction product mixture of cellulosic biomass material often pose a challenge as mentioned above. In addition, other higher molecular weight oligomers can be derived from further processing (e.g., condensation) of soluble carbohydrates, either reacting with themselves, lignin, or components derived from the partial depolymerization of lignin. These higher molecular weight oligomers form one or more heavy ends that are nonvolatile, which contribute to the overall concept of a "lignin" or heavy ends phase that are processed by various embodiments provided by this disclosure.

Various exemplary embodiments of the invention are further described with reference to the drawings. When like elements are used in one or more figures, identical reference characters will be used in each figure, and a detailed description of the element will be provided only at its first occurrence. Some features of the embodiments may be omitted in certain depicted configurations in the interest of clarity. Moreover, certain features such as, but not limited to, pumps, valves, gas bleeds, gas inlets, fluid inlets, fluid outlets and the like have not necessarily been depicted in the figures, but their presence and function will be understood by one having ordinary skill in the art.

Referring to FIG. 1, biomass feedstock 11 is provided to digestion unit 12 where biomass feedstock 11 is contacted with a digestive media or solvent to further process biomass feedstock 11 into product mixture 13 comprising fully and/or partially hydrolyzed biomass. In one embodiment (not shown), product mixture 13 may be further processed, such as in further processing zone 19, to produce chemicals and/or biofuels. Digestion unit 12 is coupled to separation zone 14 to provide product mixture 13 to separation zone 14. In one embodiment, digestion unit 12 is in fluid communication with separation zone 14. As shown, at least a portion of product mixture 13 is separated or fractionated in separation zone 14 into at least two fractions: overhead fraction 15 and bottom fraction 16. At least a portion of bottom fraction 16 is routed to recovery unit 100 where at least a portion of bottom fraction 16 is combusted to generate heat that is used to vaporize one or more volatile organic compounds (VOCs) in bottom fraction 16.

At least a portion of one or more vaporized VOCs in bottom fraction 16 exits recovery unit 100 as overhead product 118, which can be fed directly into further processing zone 19 separately and/or combined with overhead fraction 15. In a preferred embodiment, at least a portion of compounds not vaporized and remaining in recovery system 100 are combusted. In one embodiment, the heat generated from combustion can be harnessed in various manners known to one of ordinary skill in the art, such as those further provided below. For example, in one embodiment, recovery unit 100 is coupled to digestion unit 12 to provide digestion unit 12 with steam from recovery unit 100 via stream 27.

Any suitable type of biomass can be used as biomass feedstock 11. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, duckweed, and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Biomass feedstock 11 may be natively present in any sizes, shapes, or forms, or it may be further processed prior to entering digestion unit 12. Examples of further processing include washing (such as, with water, an acid, a base, combinations thereof, and the like), torrefaction, liquefaction, such as pyrolysis, or reduction in size. In some embodiments, the reduction in size may include chipping, chopping, grounding, shredding, pulverizing, and the like to produce a desired size. Thus, in some embodiments, providing a biomass material can comprise harvesting a lignocelluloses-containing plant such as, for example, a hardwood or softwood tree. The tree can be subjected to debarking, chipping to wood chips of desirable thickness, and washing to remove any residual soil, dirt and the like.

In a preferred embodiment, overhead fraction 15 comprises compounds having a vaporization point that is lower than that of bottom fraction 16, and bottom fraction 16 comprises compounds having a separation point having a temperature in a range of about 100 to 600 degrees C. and a pressure of about atmospheric pressure, more preferably a temperature in a range of about 100 to 500 degrees C. and a pressure in a range of about 1 to 100 Torr, preferably about 3 to 20 Torr, such as about 10 Torr; and most preferably a temperature in a range of about 200 to 450 degrees C. and a pressure in a range of about 1 to 100 Torr, preferably about 3 to 20 Torr, such as about 10 Torr. As used herein, a "separation point" refers to a temperature and pressure at or above which a component does not become a vapor or gas. For example, bottom fraction 16 comprises (i) at least one compound having a separation point having a temperature in a range of about 100 to 600 degrees C. and a pressure of about atmospheric pressure and (ii) at least one a volatile organic compound. In this instance, the at least one compound having the recited separation point does not become a vapor or gas, e.g., vaporize, at or above about 100 to 600 degrees C. and a pressure of about atmospheric pressure. Overhead fraction 15 comprises compounds that would vaporize at a temperature in a range about 100 to 600 degrees C. and pressure of about atmospheric pressure, more preferably a temperature in a range of about 100 to 500 degrees C. and about 1 to 100 Torr, preferably about 3 to 20 Torr; most preferably a temperature in a range of about 200 to 450 degrees C. and about 1 to 100 Torr, preferably about 3 to 20 Torr. It is understood that components or compounds in bottom fraction 16 may degrade or convert into different compounds at a separation point. Compounds in overhead fraction 15 can be referred to as light components while compounds in bottom fraction 16 can be referred to as heavy components or heavy ends. Overhead fraction 15 can be further processed into chemicals and/or biofuels, such as in further processing zone 19. In one embodiment, bottom fraction 16 comprises at least one of lignin, a lignin-derived compound, unextracted cellulose, unextracted hemicellulose, a caramelan, and other high molecular weight carbonaceous compounds derived from adverse reactions of carbohydrates, sugars, and lignin-derived species. Non-limiting exemplary lignin-derived compounds can include partially depolymerized lignin moieties containing 5-'5, phenylcoumaran, and β-O-4 linkages as characterized by monomeric compounds, phenol, o-cresol, p-cresol, anisole, 4-methylanisole, catechol, guaiacol, 4-methylguaiacol, 1,3-dimethoxybenzene, syringol, and vanillin. Other different compounds include methanol, methoxyphenol, methyl phenol, dimethyl phenol, ethyl phenol, methyl ethyl phenol, methoxypropylphenol, benzene diol, propyl phenol, and similar compounds. Bottom fraction 16 can further comprise oligomeric derivatives of carbohydrates, and intermediates, including phenolic intermediates derived from lignin, unreacted or partially hydrolyzed cellulose and hemicellulose, cellulose condensation products, caramelans, and cross polymerization products of sugars and phenolic intermediates.

In a preferred embodiment, a digestion reaction takes place in digestion unit 12. Any suitable digestion process that forms a pretreated biomass containing soluble carbohydrates may be used. Examples of suitable digestion processes can be found in U.S. Application Publication Nos. US2012/0152836, and US2012/0156743, the disclosure of each is incorporated herein by reference in its entirety. In digestion unit 12, biomass feedstock 11 is contacted with a digestive solvent in at least one digester where the digestion reaction takes place.

In one embodiment, a digestive solvent used in digestion unit 12 can comprise an organic solvent that is at least partially water miscible and has partial solubility in water, preferably greater than 2 weight percent in water. In one such embodiment, the digestive solvent is a water-organic solvent mixture with optional inorganic acid promoters such as HCl or sulfuric acid. Oxygenated solvents exhibiting full or partial water solubility are preferred digestive solvents. In such a process, the organic digestive solvent mixture can be, for example, methanol, ethanol, acetone, ethylene glycol, triethylene glycol and tetrahydrofurfuryl alcohol. Organic acids such as acetic, oxalic, acetylsalicylic and salicylic acids can also be used as catalysts (as acid promoter) in the at least partially miscible organic solvent process. Temperatures for the digestion may range from about 130 to about 300 degrees Celsius, preferably from about 140 to 250 degrees Celsius, and contact times from 0.25 to 24 hours, preferably from about one to 4 hours. Preferably, a pressure from about 250 kPa to 13000 kPa, and most typically from 700 to 10000 kPa, maintained on the system to avoid boiling or flashing away of the solvent.

In another embodiment, at least a portion of product mixture 13 generated in digestion unit 12 can be optionally further subject to a catalytic reduction reaction in hydrocatalytic treatment unit 17 where product mixture 13 is reacted with hydrogen in the presence of a metal catalyst capable of activating molecular hydrogen to form hydrocatalytically treated mixture 18 comprising a plurality of hydrocarbons, including oxygenated hydrocarbon molecules, which can be further processed to form other desired compounds, such as biofuels components.

For embodiments that facilitate conversion of biomass 11 to an eventual fuel component, subjecting product mixture 13 to one or more catalytic reduction reactions, such as that which take place in hydrocatalytic treatment unit 17 including hydrogenation and/or hydrogenolysis reactions, protects at least a portion of soluble carbohydrates in product mixture 13 from thermal degradation, thereby allowing further processing of such carbohydrates into desired components. While suitable for further transformation, soluble carbohydrates can be very reactive and can rapidly degrade to produce caramelans and other degradation products, especially under higher temperature conditions, such as above about 15° degrees C. Depending on the reaction conditions and catalyst used, reaction products formed as a result of conducting one or more catalytic reduction reactions on soluble carbohydrates may comprise, as mentioned, oxygenated hydrocarbon molecules, including one or more alcohol functional groups, particularly including triols, diols, monohydric alcohols, and any combination thereof, some of which may also include a residual carbonyl functionality (e.g., an aldehyde or a ketone). As used herein, the term "hydrocarbons" refers to compounds containing both carbon and hydrogen without reference to other elements that may be present. Thus, heteroatom-substituted compounds are also described herein by the term "hydrocarbons." The term "hydrocatalytic treatment" refers to a type of thermocatalytic reaction where the reaction is with hydrogen in the presence of a catalyst capable of activating molecular hydrogen, preferably a metal catalyst.

Descriptions of exemplary digestion and catalytic reduction reactions and corresponding systems can be found in U.S. Application Publication Nos. US2012/0152836, US2012/0156743, and US2011/0154721, the entire content of each is hereby incorporated by reference. For example, digestion unit 12 of FIG. 1 of the present disclosure can comprise digestion 106 shown in FIGS. 1-5 of US2012/ 0152836, and hydrocatalytic treatment unit 17 of FIG. 1 of the present disclosure can comprise hydrogenolysis system 126 shown in FIGS. 1-5 of US2012/0152836. In another embodiment, hydrocatalytic treatment unit 17 can comprise any combination of hydrogenolysis systems 126, 126A, 126B, and 126C shown in FIGS. 1-5 of US2012/0152836. In one embodiment, digestion unit 12 can comprise pretreat system 104 and/or treatment system 110 shown in FIGS. 1-2 of US2012/0156743, and hydrocatalytitc treatment unit 17 can comprise hydrogenolysis system 120 shown in FIGS. 1-2 of US2012/0156743. In yet another example, digestion unit 12 of FIG. 1 of the present disclosure can comprise hydrolysis reaction 114 of FIG. 3 of US2011/0154721, and hydrocatalytic treatment unit 17 can comprise hydrogenation reaction 104 and/or hydrogenolysis reaction 106 of FIGS. 1, 2, and/or 3 of US2011/0154721. The descriptions of reactions and systems of U.S. Application Publication Nos. US2012/0152836, US2012/0156743, and US2011/0154721 have already been incorporated by reference in their entirety, and thus need not be repeated As shown in FIG. 1 of the present disclosure, at least a portion of hydrocatalytically treated mixture 18 exiting hydrocatalytic treatment unit 17 can be routed to separation zone 14 to separate hydrocatalytically treated mixture 18 and/or product mixture 13 into at least overhead fraction 15 and bottom fraction 16, which can be routed to recovery unit 100 for processing as described herein. It is understood that the hydrocatalytic treatment that takes place in hydrocatalytic treatment unit 17 can employ aqueous phase and/or organic phase solvents. For example, US2011/0154721, US2012/0152836, and US2012/0156743 provide examples of hydrocatalytic treatment that occurs in aqueous phase. Exemplary descriptions of a hydrocatalytic treatment that takes place in an organic phase can be found in U.S. Application Publication No. US2013/0109896, the disclosure of which is hereby incorporated by reference in its entirety.

In one embodiment, digestion unit 12 of FIG. 1 of the present disclosure can comprise digestion system 10 of FIGS. 1 and 2 of US2013/0109896, and hydrocatalytic treatment system 17 can comprise organic phase hydrocatalytic treatment system 20 shown in FIG. 1 of US2013/0109896. The descriptions corresponding to digestive system 10 and organic phase hydrocatalytic treatment system 20 are provided by US2013/0109896, which is incorporated by reference in its entirety, and thus need not be repeated. In such embodiments, at least a portion of organic hydrocarbon-rich phase stream 32 shown in FIG. 1 of US2013/0109896 can be routed to separation zone 14 shown in FIG. 1 of this disclosure, to separate organic hydrocarbon-rich phase stream 32 into overhead fraction 15 and bottom fraction 16, which can be processed by recovery unit 100 as described herein. In one embodiment, the liquid-liquid separation 30 in FIG. 1 of US2013/0109896 can be part of separation zone 14. That is, separation zone 14 can comprise the liquid-liquid separation 30 in FIG. 1 of US2013/0109896. For example, in one embodiment, separation zone 14 comprises a liquid-liquid separation step, such as that described in US2013/0109896, which provides bottom fraction 16, which can be routed to recovery unit 100. In addition to or as an alternative, in one embodiment, the liquid-liquid separation step provides an organic hydrocarbon-rich phase that is further separated in separation zone 14 to provide bottom fraction 16.

In addition to or alternatively, digestion unit 12 can comprise hydrothermal digestion of biomass feedstock 11 that is preferably conducted in the presence of molecular hydrogen and a slurry catalyst capable of activating the molecular hydrogen. In such particular embodiments, hydrothermal digestion of cellulosic biomass and the catalytic reduction of soluble carbohydrates produced therefrom preferably take place in the same vessel, which can be referred to as "in situ catalytic reduction reaction processes." As used herein, the term "slurry catalyst" will refer to a catalyst comprising fluidly mobile catalyst particles that can be at least partially suspended in a fluid phase via gas flow, liquid flow, mechanical agitation, or any combination thereof. In one embodiment, digestion unit 12 comprises a hydrothermal digestion where digestion of cellulosic biomass and catalytic reduction of soluble carbohydrates take place in the same vessel. In such an embodiment, at least a portion of product stream exiting digestion unit 12 may be also further routed to an additional optional catalytic reduction reaction in hydrocatalytic treatment unit 17. In some embodiments, product mixture 13 can be further processed, such as in further processing zone 19, to form other desired compounds, such as biofuels components.

In yet another embodiment, digestion unit 12 comprises hydrothermal digestion, particularly as described in U.S. Application Publication No. 61/665,641, filed on Jun. 28, 2012, 61/720,757, filed on Oct. 31, 2012, and 61/817,996, filed on May 1, 2013, the disclosures of which are hereby incorporated by reference in their entirety.

For example, in one embodiment, digestion unit 12 of FIG. 1 of the present disclosure can comprise hydrothermal digestion unit 2 shown in FIG. 1 of U.S. Application No. 61/665,641. In another embodiment, if hydrocatalytic treatment unit 17 is employed, it can comprise catalytic reduction reactor unit 4 shown in FIG. 1 of U.S. Application No. 61/665,641. The descriptions corresponding to hydrothermal digestion unit 2 and catalytic reduction reactor unit 4 are provided by U.S. Application No. 61/665,641, which is incorporated by reference in its entirety, and thus need not be repeated. Further, in one embodiment, phase separation mechanism 26 in FIG. 1 of U.S. Application No. 61/665,641 can be part of separation zone 14 of FIG. 1 of the present disclosure. That is, separation zone 14 can comprise phase separation mechanism 26 in FIG. 1 of U.S. Application No. 61/665,641 that provides bottom fraction 16 which can be routed to recovery unit 100. In addition to or alternatively, in one embodiment, phase separation mechanism 26 in FIG. 1 of U.S. Application No. 61/665,641 provides an organic phase that is further separated in separation zone 14 to provide bottom fraction 16.

In another embodiment, digestion unit 12 of FIG. 1 of the present disclosure can comprise at least one of hydrothermal digestion unit 2 shown in FIG. 1 of U.S. Application No. 61/720,757. In another embodiment, if hydrocatalytic treatment unit 17 is employed, it can comprise polishing reactor 16 shown in FIG. 1 of U.S. Application No. 61/720,757, where one or more catalytic reduction reactions can further take place to protect soluble carbohydrates from thermal degradation as described. The descriptions corresponding to hydrothermal digestion unit 2 and polishing reactor 16 are provided by U.S. Application No. 61/720,757, which is incorporated by reference in its entirety, and thus need not be repeated. In such embodiments, at least a portion of lignin removal line 18 shown in FIG. 1 of U.S. Application No. 61/720,757 can be routed to separation zone 14 shown in FIG. 1 of the present disclosure, to provide bottom fraction 16. In addition to or alternatively, in embodiments comprising polishing reactor 16 shown in FIG. 1 of U.S. Application No. 61/720,757, at least a portion of the product stream exiting polishing reactor 16 can be routed to separation zone 14 shown in FIG. 1 of the present disclosure to provide a bottom fraction 16, which can be routed to recovery unit 100 as described. That is, an input to separation zone 14 can include a product from hydrothermal digestion unit 2 and/or polishing reactor 16 of U.S. Application No. 61/720,757.

In yet another embodiment, digestion unit 12 of FIG. 1 of the present disclosure can comprise hydrothermal digestion unit 2 and polishing reactor 16 shown in FIGS. 1-12 of U.S. Application No. 61/817,996. In another embodiment, if hydrocatalytic treatment unit 17 is employed, it can comprise polishing reactor 16 shown in FIGS. 1-12 of U.S. Application No. 61/817,996, where one or more catalytic reduction reactions can further take place to protect soluble carbohydrates from thermal degradation as described. The descriptions corresponding to hydrothermal digestion unit 2 and polishing reactor 16 are provided by U.S. Application No. 61/817,996, which is incorporated by reference in its entirety, and thus need not be repeated. In such embodiments, at least a portion of lignin removal line 18 shown in FIGS. 1-12 of U.S. Application No. 61/817,996 can be routed to separation zone 14 shown in FIG. 1 of the present disclosure to provide bottom fraction 16. In addition to or alternatively, in embodiments comprising polishing reactor 16 shown in FIGS. 1-12 of U.S. Application No. 61/817,996, at least a portion of the product stream exiting polishing reactor 16 can be routed to separation zone 14 shown in FIG. 1 to provide bottom fraction 16. That is, an input to separation zone 14 can include a product from hydrothermal digestion unit 2 and/or polishing reactor 16 of U.S. Application No. 61/817,996. In one embodiment, separations unit 32 in FIGS. 1-12 of U.S. Application No. 61/817,996 can be part of separation zone 14. That is, separation zone 14 can comprise separations unit 32 in FIGS. 1-12 of U.S. Application No. 61/817,996 that provides bottom fraction 16 which can be routed to recovery unit 100. In addition to or alternatively, in one embodiment, separations unit 32 in FIGS. 1-12 of U.S. Application No. 61/817,996 provides a portion that is further separated in separation zone 14 to provide bottom fraction 16.

Referring to FIG. 1 of the present disclosure, at least a portion of product mixture 13 formed in digestion unit 12 and/or hydrocatalytically treated mixture 18 from hydrocatalytic system 17 is routed to separation zone 14 where mixture 13 and/or 18 can be separated into different components that can be further processed accordingly. In a preferred embodiment, at least a portion of mixture 13 and/or 18 is separated into at least two fractions in separation zone 14: overhead fraction 15 and bottom fraction 16. In one embodiment, separation zone 14 can comprise a phase separator, a stripping column, an extractor, a filter, a distillation column, a flasher, or any combination thereof.

In a preferred embodiment, separation zone 14 separates mixture 13 and/or 18 into various components based on the volatility property (separation point) of the compounds in mixture 13 and/or 18 under various temperature and pressure conditions. For example, a temperature in a range of about 100 to 600 degrees C. and a pressure of about atmospheric pressure, more preferably in a range of about 100 to 500 degrees C. at a pressure of about 1 to 100 Torr, preferably about 3 to 20 Torr, such as about 10 Torr; most preferably in a range of about 200 to 450 degrees C. at a pressure of about 1 to 100 Torr, preferably about 3 to 20 Torr, such as about 10 Torr, can be applied to at least a portion of mixture 13 and/or 18. In one embodiment, compounds that vaporize under these conditions become overhead fraction 15, which can be collected for further processing, and compounds that do not vaporize remain to form bottom fraction 16. The temperature and pressure can be applied gradually in a continuous or step-wise manner or rapidly as desired or according to operating conditions using suitable techniques known to those skilled in the art, such as those employed in distillation columns. The temperature and pressure can be applied for any suitable duration. Such manners of applying temperature and pressure to separate components based on vaporization properties are known to those skilled in the art. Examples of a suitable time period include about 1-60 minutes. Bottom fraction 16 preferably comprises lignin and/or lignin-derived compounds, such as partially depolymerized lignin moieties containing 5-'5, phenylcoumaran, and β-O-4 linkages as characterized by monomeric compounds phenol, o-cresol, p-cresol, anisole, 4-methylanisole, catechol, guaiacol, 4-methylguaiacol, 1,3-dimethoxybenzene, syringol, and vanillin. Other derived compounds include methanol, methoxyphenol, methyl phenol, dimethyl phenol, ethyl phenol, methyl ethyl phenol, methoxypropylphenol, benzene diol, propyl phenol, and similar compounds. In a preferred embodiment, bottom fraction 16 is a solid at ambient temperature and can flow at higher temperatures, such as greater than 100 degrees C. The viscosity of bottom fraction 16 preferably decreases with increasing temperature. In one embodiment, the viscosity of bottom fraction 16 at a temperature of about 75 degrees C. is preferably about 1 to 10,000 centipoise (cP), more preferably about 100 to 5,000 cP, most preferably about 500 to 1000 cP. As will be understood by those of ordinary skill in the art, the viscosity and therefore the pumpability of bottom fraction 16 from separation zone 14 can be affected by various factors, including temperature, pressure, concentration of various compounds in the particular bottom fraction, composition, diluents, if any are used, impurity levels, storage time. If the physical state of bottom fraction 16 is solid to viscous, or a semi-solid liquid, it can be heated to a temperature and/or the pressure suitable to render it sufficiently fluid to be pumped, as desired.

Referring to FIG. 1, at least a portion of bottom fraction 16 is routed to recovery unit 100 where it is combusted, or at least certain combustible components in bottom fraction 16 are combusted, to generate heat that is used to vaporize one or more VOCs in bottom fraction 16. At least a portion of one or more vaporized VOCs in bottom fraction 16 exits recovery unit 100 as overhead product 118, which can be fed directly into further processing zone 19 separately and/or combined with overhead fraction 15 prior to entering further processing zone 19. In one embodiment, bottom fraction 16 enters recovery system 100 as a liquid.

Recovery unit 100 can generate steam, which can be used in other processes. For example, as shown, steam from recovery unit 100 can be routed to digestion unit 12, shown as stream 27, for use in any suitable manner known to one of ordinary skill in the art, such as a heating medium. For example, in one embodiment, recovery unit 100 is coupled to digestion unit 12 to provide digestion unit 12 with steam from recovery unit 100 via stream 27 as shown in FIG. 1. In a preferred embodiment, the steam contained in stream 27 is provided to digestion unit 12 at a pressure in a range of about 20-120 bar, more preferably about 40 to 100 bar, most preferably 40 to 90 bar. The steam can be saturated or with superheat. In one embodiment, steam from another source can be provided to digestion unit 12. In such an embodiment, stream 27 can be combined with steam from the boiler and the mixture of both can be provided as one stream or steam from the boiler and steam from recovery unit 100 can be provided separately.

Overhead fraction 15 and/or overhead product 118 can be subject to further processing to produce a higher molecular weight compound. In one embodiment, the further processing takes place in processing zone 19 shown in FIG. 1. Non-limiting exemplary further processing methods include (i) reforming reactor 38 shown in FIGS. 1-12 of U.S. Application No. 61/817,996, (ii) reforming reactor 28 shown in FIG. 1 of U.S. Application No. 61/720,757, (iii) processing system 130 shown in FIGS. 1-2 of US2012/0156743, (iv) processing step 136 shown in FIGS. 1-5 of US2012/0152836; and processing reaction 110 shown in FIGS. 1-3 of US2011/0154721. In general, suitable further processing reactions include, but are not limited to, hydrogenolysis reactions, hydrogenation reactions, condensation reactions, isomerization reactions, oligomerization reactions, hydrotreating reactions, alkylation reactions, and any combination thereof.

FIGS. 2A and 2B illustrate an exemplary embodiment of recovery unit 100. As shown, recovery unit 100 comprises flasher 102, flasher 104, valve 106, valve 108, heating component 110, and steam generating superheater 112. Flasher 102 and flasher 104 are adapted to receive the flow of bottom fraction 16 therethrough. While only two flashers are shown in FIGS. 2A and 2B, it is understood that system 100 can comprise more than two flashers. Valve 106 controls flow of bottom fraction 16 into flasher 102 and flasher 104. Valve 108 controls flow of overhead product 118 out of flasher 102 and flasher 104. In operation, if flasher 102 is on-line or in use and flasher 104 is off-line or on standby, valve 106 is set to allow bottom fraction 16 to flow into flasher 102 and not flasher 104 and valve 108 is set to allow overhead product 118 to exit flasher 102. If flasher 104 is on-line and flasher 102 is off-line, valve 106 is set to allow bottom fraction 16 to flow into flasher 104 and not flasher 102 and valve 108 is set to allow overhead product 118 to exit flasher 104. It is understood that suitable means other than valves known to those skilled in the art can be used to allow flasher 102 and 104 to switch between on-line and off-line modes. Referring to FIGS. 2A and 2B, prior to entering the respective flasher in operation, bottom fraction 16 is heated by heating component 110. Heating component 110 can comprise any suitable heating device, such as a furnace or heat exchanger.

Referring to FIG. 2A, flasher 102 is on-line, where valve 106 and valve 108 are set to allow fluid communication between flasher 102 and separation zone 14 and further processing zone 19 so flasher 102 can receive bottom fraction 16 from separation zone 14 and forward overhead product 118 to the next process, such as further processing zone 19 while flasher 104 is off-line or in standby mode. In standby mode, flasher 104 does not receive bottom fraction 16. Referring to FIG. 2B, flasher 104 is on-line where valve 106 and valve 108 are set to allow fluid communication between flasher 104 and separation zone 14 and further processing zone 19 so flasher 104 can receive bottom fraction 16 from separation zone 14 and forward overhead product 118 to further processing zone 19 while flasher 102 is off-line or in standby mode. Referring to FIGS. 2A and 2B, the flow of bottom fraction 16 into and of overhead product 118 out of the on-line flasher is designated by solid lines while similar lines are dashed for the flasher that is in standby mode.

As shown in FIGS. 2A and 2B, after bottom fraction 16 is heated by heating component 110, it preferably enters recovery unit 100 as a fluid, e.g., having fluid-like properties. In one embodiment, bottom fraction 16 comprises (i) at least one compound having a separation point having a temperature in a range of about 100 to 600 degrees C. and a pressure of about atmospheric pressure and (ii) one or more volatile organic compounds. As bottom fraction 16 flows through flasher 102 or 104, one or more volatile organic compounds are flashed or vaporized while lignin and/or other components not vaporized during operation are deposited on a surface of flasher 102 or 104. In one embodiment, a surface of flasher 102 or 104 onto which material is deposited can comprise a surface of a packer disposed in the respective flasher. The vaporized organic compounds, represented as overhead product 118, exit flasher 102 or 104 where it can be collected for further processing, such as that of further processing zone 19, as desired. In a particular embodiment, overhead product 118 includes organic intermediates that are volatile organic compounds, such as oxygenated intermediate, including one or more polyols, alcohols, ketones, mono-oxygenates, diols, and/or any other hydrocarbon having at least one oxygen atom. In certain embodiments where bottom fraction 16 comes from digestion of cellulosic material, particularly coming from a digester operating at higher temperatures, bottom fraction 16 also includes caramel, or caramelan, formed from heating sugars in the cellulosic biomass material, which are not vaporized and are deposited on a surface of flasher 102 or 104.

Referring to FIG. 2A, in operation, at least a portion of bottom fraction 16 exits separation zone 14 and enters flasher 102 of recovery unit 100. In a preferred embodiment, bottom fraction 16 is heated by heating component 110 prior to entering flasher 102. One or more volatile organic compounds are flashed into overhead product 118 in flasher 102 and the remaining compounds are deposited on a surface of flasher 102. At least a portion of overhead product 118 exits flasher 102 and enters further processing zone 19. Operation of recovery unit 100 continues until the flashing capability of flasher 102 diminishes beyond a certain level, which can be established as desired and/or dictated by operating conditions. Referring to FIG. 2B, flasher 102 can be taken off-line and flasher 104 can be put on-line where valve 106 and valve 108 are set to allow bottom fraction 16 to enter flasher 104 to produce overhead product 118 so operation of recovery unit 100 may continue with minimal interruptions. The operation of recovery unit 100 can continue with the switching back and forth between flasher 102 and flasher 104, or any additional flashers as described.

Referring to FIGS. 2A and 2B, the material deposited in the flasher that is in standby mode, e.g., flasher 104 in FIG. 2A and flasher 102 in FIG. 2B, is removed through combustion. As shown, oxygen-containing fluid 114 is added for combustion, which burns the deposited material and removes it from the flasher in standby mode. Combustion is an exothermic reaction between a fuel and an oxidant that produces primarily carbon dioxide and water. The fuel in this case is the material deposited in the flasher in standby mode and the oxidant is preferably oxygen in oxygen-containing fluid 114. It is understood by one of ordinary skill that in certain embodiments, at least one flasher in use, such as flasher 102 or 104, may include a suitable thermal lining, such as brick or other ceramic material, to protect the flasher metallurgy against one or more effects of combustion conditions, such as high temperatures.

Thermal energy 116 generated by the combustion can be harnessed in several ways. One exemplary manner of harnessing thermal energy 116 is to generate steam where thermal energy 116 can be used to generate steam using means known to those skilled in the art. For example, steam can be generated by applying thermal energy 116 to steam generating superheater 112, which can comprise one or more conduits (not shown), such as tubes, containing water. When enough heat is transferred to the conduits, the water evaporates and becomes steam, which can be used as a heating medium for other parts of the process, such as routed to digestion unit 12 via stream 27. Referring to FIGS. 2A and 2B, another way of harnessing thermal energy 116 is to route it to heating component 110 for use to heat up bottom fraction 16 prior to entering the flasher in operation. Yet another way of harnessing thermal energy 116 is to generate electricity using generated steam to turn a turbine (not shown) as known to those skilled in the art. Because a product of combustion in the flasher in standby mode is steam, this steam can be harnessed directly in similar manners described above or in other suitable manners known to those skilled in the art. In yet another embodiment (not shown), at least two flashers (e.g., 102 and 104) are heat integrated in operation so that the thermal energy generated from combustion in the off-line flasher can be used in the flashing operation of the on-line flasher. Additional heat from another source may also be provided to the on-line flasher as desired.

FIGS. 3A and 3B illustrate another exemplary embodiment of recovery unit 100 where flasher 102 and flasher 104 further comprise conduit 130 configured to circulate a heat exchange medium to further heat or cool bottom fraction 16 to achieve vaporization of desired volatile organic compounds. Conduit 130 can have any suitable configuration known to those skilled in the art. FIGS. 3A and 3B illustrate two exemplary embodiments of such configurations. In FIG. 3A, conduit 130 comprises one or more folds or undulations while in FIG. 3B, at least a portion of conduit 130 has a spiral shape. The number, size, spacing, and other properties of such shapes can be of any suitable manner and can be adjusted as desired or as needed by operating conditions as known by one of ordinary skill. The heat exchange medium can be of any suitable type and in any suitable phase including liquid or gas. The temperature and type preferably depends at least on whether it is desired to heat or cool bottom fraction 16 in the respective flasher.

Referring to FIGS. 3A and 3B, during operation, if it is desired to further heat up bottom fraction 16 in flasher 102 or 104, a heat exchange medium with temperature higher than the temperature of bottom fraction 16 can be circulated through conduit 130. When bottom fraction 16 comes in contact with conduit 130, it is heated up further. If it is desired to cool bottom fraction 16 in flasher 102 or 104, a heat exchange medium with temperature lower than the temperature of bottom fraction 16 can be circulated through conduit 130. When bottom fraction 16 comes in contact with conduit 130, it is cooled down. As such, conduit 130 can be used to further regulate or control the temperature of bottom fraction 16 in flasher 102 or 104 to achieve the desired vaporization conditions.

Figure 4B:
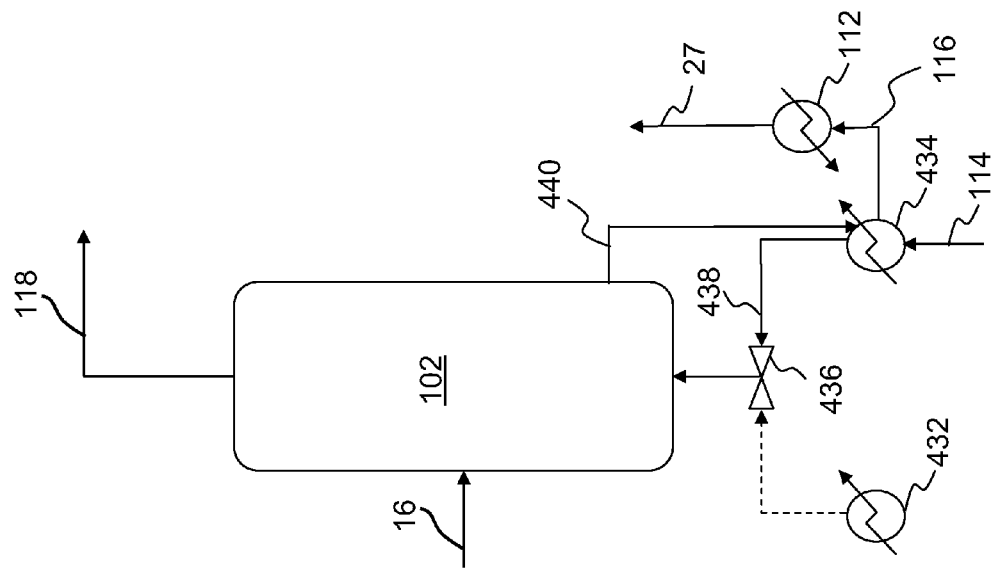
FIGS. 4A and 4B are schematics of a third exemplary embodiment of a recovery unit according to aspects provided by the present disclosure.
Figure 4A:
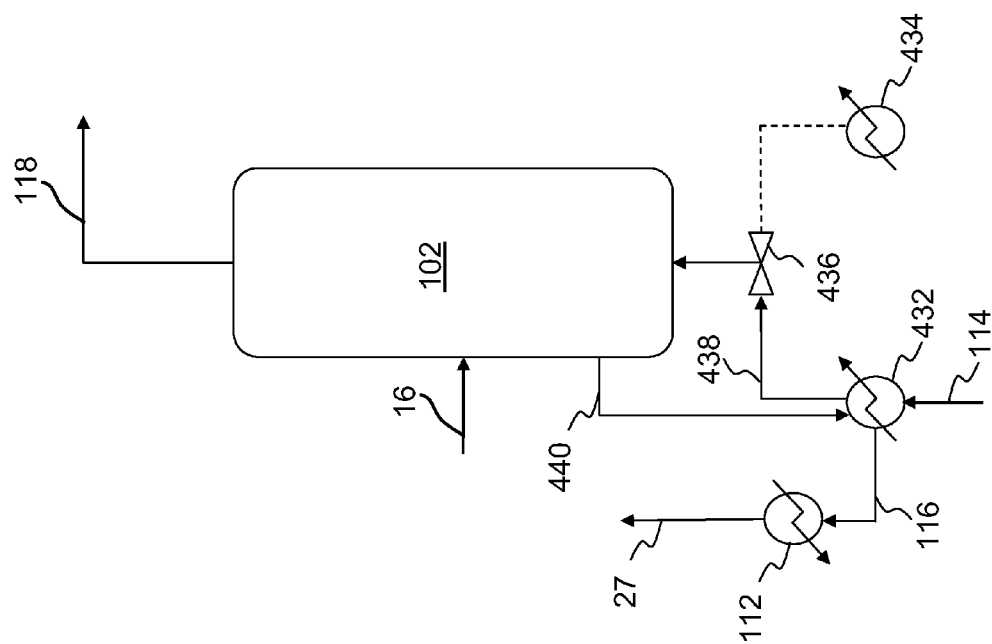

FIGS. 4A and 4B illustrate yet another embodiment of recovery unit 100. Referring to FIGS. 4A and 4B, recovery unit 100 comprises flasher 102 and reboiler 432 and reboiler 434, valve 436, and steam generating superheater 112. While only two reboilers are shown in FIGS. 4A and 4B, it is understood that system 100 can comprise more than two reboilers. Flasher 102 is coupled to reboiler 432 and reboiler 434 to receive thermal energy 438 generated by the respective reboiler. Valve 436 controls flow of thermal energy 438 generated by reboiler 432 or 434 into flasher 102. In operation, if reboiler 432 is on-line or in use and reboiler 434 is off-line or on standby, valve 436 is set to allow thermal energy 438 to flow into flasher 102. If reboiler 434 is on-line and reboiler 432 is off-line, valve 436 is set to allow thermal energy 438 to flow into flasher 102. It is understood that suitable means other than valves known to those skilled in the art can be used to allow reboiler 432 and 434 to switch between on-line and off-line modes. Referring to FIGS. 4A and 4B, the flow of thermal energy 438 into the on-line reboiler is designated by solid lines while similar lines are dashed for the flasher that is in standby mode.

Referring to FIG. 4A, during operation where reboiler 432 is on-line, bottom fraction 16 is fed to flasher 102 from separation zone 14. One or more volatile organic compounds in bottom fraction 16 is flashed into overhead product 118 in flasher by thermal energy 438 generated by reboiler 432. At least a portion of overhead product 118 exits flasher 102 and enters further processing zone 19. Residue 440 of remaining components that are not vaporized returns to reboiler 432. As operation continues, the remaining components are deposited on a surface of reboiler 432. Operation of recovery unit 100 continues until the heat transfer capability of reboiler 432 diminishes beyond a certain level, which can be established as desired and/or dictated by operating conditions. Referring to FIG. 4B, reboiler 432 can be taken off-line and flasher 434 can be put on-line where valve 436 is set to allow thermal energy 438 to enter reboiler 434 to produce overhead product 118 so operation of recovery unit 100 may continue with minimal interruptions when a reboiler's heat transfer capability falls below a certain level. The operation of recovery unit 100 can continue with the switching back and forth between reboiler 432 and reboiler 434, or any additional reboilers as described. In one embodiment, flasher 102 can further comprise conduit 130 illustrated and described with respect to FIGS. 3A and 3B.

The material deposited in the reboiler in standby mode, e.g., reboiler 434 in FIG. 4A and reboiler 432 in FIG. 4B, is removed through combustion. As shown, oxygen-containing fluid 114 is added for combustion, which burns the deposited material and removes it from the reboiler in standby mode. Thermal energy 116 generated by the combustion can be harnessed in several ways. One exemplary manner of harnessing thermal energy 116 is to generate steam where thermal energy 116 can be used to generate steam 27 using means known to those skilled in the art. For example, as shown, steam 27 can be generated by applying thermal energy 116 to steam generating superheater 112, which can comprise one or more conduits (not shown), such as tubes, containing water. When enough heat is transferred to the conduits, the water evaporates and becomes steam 27, which can be used as a heating medium for other parts of the process, such as digestion unit 12. Another way of harnessing thermal energy 116 is to generate electricity using steam 27 to turn a turbine (not shown) as known to those skilled in the art. Because a product of combustion in the reboiler in standby mode is steam, this steam can be harnessed directly in similar manners described above with respect to steam 27 or in other suitable manners known to those skilled in the art.

Any suitable flashing techniques known to one of ordinary skill in the art can be used to vaporize organic compounds in bottom fraction 16. For example, one or more temperatures between about 100 to 600 degrees C. at a pressure of about 0.01 to 250 psi can be applied to bottom fraction 16 in a flasher in operation, such as flasher 102 or 104, in one or multiple stages. Preferably, one or more temperatures in a range of about 100 to 600 degrees C. at a pressure of about 0.05 to 150 psi can be applied to bottom fraction 16 in one or multiple stages. More preferably, one or more temperatures in a range of about 200 to 450 degrees C. at a pressure of about 0.01 to 250 psi or about 0.05 to 150 psi can be applied to bottom fraction 16 in one or multiple stages. Most preferably, a temperature of at least 300 degrees C. at a pressure of about 0.01 to 250 psi or about 0.05 to 150 psi can be applied to bottom fraction 16 in one or multiple stages. In a preferred embodiment, if a multistage distillation technique is used, the initial stage starts with low temperature and subsequent stages have increasingly higher temperatures until the final or bottoms stage has the highest temperature.

In embodiments where the flashing of organic compounds in bottom fraction 16 is carried out at higher than atmospheric pressure (about 1 atm or about 14.696 psi), the higher pressure can facilitate transport of overhead product 118 to the next processing step, such as further processing zone 19. In a preferred embodiment, if higher than atmospheric pressure is used, the pressure applied is about the same pressure or slightly higher than the pressure of the next reaction stage. For example, in one embodiment, the pressure for overhead product 118 can be the same or slightly higher than the operating pressure of further processing zone 19. For such embodiments employing distillation at higher than atmospheric pressure, the process can be more energy efficient since the need to condense the VOCs and subsequent vaporization in preparation for the next stage is eliminated or substantially minimized. In one embodiment, a stripping agent such as steam can optionally be used to facilitate flow of overhead product 118 to the next reaction zone. In another embodiment, a pressure of about 15 to 30 psi is used if it is desired to prevent air from entering the heat exchange process. In yet another embodiment, the heat exchange can take place under vacuum, which can prevent formation of heavy ends.

Heating component 110 can comprise any system suitable to transfer heat to bottom fraction 16. Non-limiting examples include suitable heat exchangers such as shell and tube heat exchangers, pipe-in-pipe, exchangers, spiral or coiled tube, plate-type, tube-fin or plate-fin, and compact heat exchangers. Other exemplary suitable heat transfer systems include furnaces with integral heat exchange or an indirect heating fluid such as steam or hot oil. In embodiments employing reboilers, such as reboilers 432 and 434 in FIGS. 4A-4B, exemplary types of reboilers that can be employed include kettle-type, fired, thermosiphon, forced recirculation, and/or electrically heated reboilers. The reboilers can be operated under any suitable condition known to one of ordinary skill in the art.

Therefore, embodiments of the present invention are well adapted to attain the ends and advantages mentioned as well as those that are inherent therein. For instance, embodiments of the present invention allow for the recovery of valuable volatile organic compounds intermediates from a mixture containing lignin and other contaminants that are heavy and/or detrimental to the further processing of volatile organic compound intermediates, such as catalysts. Embodiments of the present invention can be operated continuously at steady state where flashing of volatile organic compounds can occur with minimal disruption and the eventual combustion of the heavy or nonvolatile components (such as lignin, caramel tars, ash, salts, etc.) can be used to remove residue from the recovery system as well as provide the thermal energy that can be used in various applications including heating up bottom fraction 16 for the flashing process.

Descriptions of exemplary suitable hydrocatalytic reactions that can take place in digestion unit 12 are known to those skilled in the art and/or provided by U.S. Application Publication Nos. US2011/0154721, US2012/0152836, US2012/0156743, and US2013/0109896, and U.S. Application No. 61/665,641, filed on Jun. 28, 2012, and 61/720,757, filed on Oct. 31, 2012, and 61/817,996, where each disclosure is incorporated herein by reference. Likewise, descriptions of exemplary suitable further processing reactions that can take place in processing zone 19 are known to those skilled in the art and/or provided by the materials that have been incorporated by reference in their entirety. Accordingly, the details of hydrocatalytic reactions and further processing reactions need not be repeated.

Nevertheless, the descriptions below highlight some aspects of certain hydrocatalytic reactions, such as hydrothermal digestion and catalytic reduction reactions, and further processing reactions. It is understood that in various embodiments where digestion unit 12 and/or hydrocatalytic treatment system 17 are employed to carry out hydrocatalytic reactions, digestion unit 12 and/or hydrocatalytic treatment system 17 can comprise any suitable number, combination, and type of reactors to perform one or more hydrocatalytic reactions.

In certain embodiments where digestion unit 12 comprises hydrothermal digestion and one or more catalytic reduction reactions, the hydrothermal digestion and one or more catalytic reduction reactions take place in the same vessel, which can provide an effective stabilization of soluble carbohydrates. The foregoing may be accomplished by including a slurry catalyst capable of activating molecular hydrogen within a hydrothermal digestion unit containing cellulosic biomass solids. That is, the catalyst that is capable of activating molecular hydrogen may comprise a slurry catalyst. As used herein, the term "slurry catalyst" refers to a catalyst comprising fluidly mobile catalyst particles that can be at least partially suspended in a fluid phase via gas flow, liquid flow, mechanical agitation, or any combination thereof. Formation of the reaction product may reduce the amount of thermal decomposition that occurs during hydrothermal digestion, thereby enabling high yield conversion of cellulosic biomass solids into a desired reaction product to take place in a timely manner.

Once the soluble carbohydrates have been at least partially transformed into a more stable reaction product during hydrothermal digestion, completion of the conversion of the soluble carbohydrates into the reaction product may take place in a separate catalytic reduction reactor unit that also employs the slurry catalyst or a different catalyst that is capable of activating molecular hydrogen. The transformation that takes place in the catalytic reduction reactor unit may comprise a further reduction in the degree of oxidation of the initial reaction product, an increased conversion of soluble carbohydrates into oxygenated intermediates, or both. As used herein, the term "oxygenated intermediates" refers to alcohols, polyols, ketones, aldehydes, and mixtures thereof that are produced from a catalytic reduction reaction of soluble carbohydrates.

Continuous, high temperature hydrothermal digestion may be accomplished by configuring the biomass conversion systems such that fresh biomass may be continuously or semi-continuously supplied to the hydrothermal digestion unit, while it operates in a pressurized state. As used herein, the term "continuous addition" and grammatical equivalents thereof will refer to a process in which cellulosic biomass is added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of biomass to a hydrothermal digestion unit without fully depressurizing the hydrothermal digestion unit.

In some embodiments described herein, a slurry catalyst may be used both in the hydrothermal digestion unit and in the catalytic reduction reactor unit to mediate the catalytic reduction reaction of soluble carbohydrates into a reaction product. Retention of the slurry catalyst in the hydrothermal digestion unit may also be aided by the low recycle ratios that may be used in the biomass conversion systems described herein. In any event, circulation of the slurry catalyst through the cellulosic biomass charge within the hydrothermal digestion unit can provide good catalyst distribution within the biomass, thereby allowing soluble carbohydrates to be effectively stabilized via a catalytic reduction reaction as soon as possible following their formation.

Since a slurry catalyst can be fluidly mobile, hydrogen sparge, solvent recycle, or any combination thereof may be used to distribute the slurry catalyst throughout the cellulosic biomass charge in the hydrothermal digestion unit. Good catalyst distribution in the cellulosic biomass may improve yields by intercepting soluble carbohydrates before they have an opportunity to degrade. Furthermore, use of a slurry catalyst may allow a fixed bed digestion unit to be more successfully used, since mechanical stirring or like mechanical agitation is not needed to affect catalyst distribution. This can allow higher biomass to solvent ratios to be utilized per unit volume of the digestion unit than would be possible in stirred tank or like digestion unit configurations. Furthermore, since stirring is not necessary, there is no express need to alter the size of the biomass solids prior to digestion taking place.

In one embodiment, poison-tolerant slurry catalyst is used. Use of a poison-tolerant catalyst may be particularly desirable, since catalyst poisons are not removed from the cellulosic biomass solids before hydrothermal digestion and integrated catalytic reduction take place. As used herein, a "poison-tolerant catalyst" is defined as a catalyst that is capable of activating molecular hydrogen without needing to be regenerated or replaced due to low catalytic activity for at least about 12 hours of continuous operation.

In some embodiments, suitable poison-tolerant catalysts may include, for example, sulfided catalysts. In some or other embodiments, nitrided catalysts may be used as poison-tolerant catalysts. Sulfided catalysts suitable for activating molecular hydrogen are described in commonly owned U.S. application Ser. No. 13/495,785, filed on Jun. 13, 2012, and 61/553,591, filed on Oct. 31, 2011, each of which is incorporated herein by reference in its entirety. Sulfiding may take place by treating the catalyst with hydrogen sulfide or an alternative sulfiding agent, optionally while the catalyst is disposed on a solid support. In more particular embodiments, the poison-tolerant catalyst may comprise a sulfided cobalt-molybdate catalyst, such as a catalyst comprising about 1-10 wt. % cobalt oxide and up to about 30 wt. % molybdenum trioxide prior to sulfidation. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the slurry catalyst may be concentrated in the fluid phase after sulfiding and then added to the hydrothermal digestion unit.

In some embodiments, the slurry catalyst may be operable to generate molecular hydrogen. For example, in some embodiments, catalysts suitable for aqueous phase reforming (i.e., APR catalysts) may be used. Suitable APR catalysts may include, for example, catalysts comprising platinum, palladium, ruthenium, nickel, cobalt, or other Group VIII metals alloyed or modified with rhenium, molybdenum, tin, or other metals, or sulfided. However, in other embodiments, an external hydrogen feed may be used, optionally in combination with internally generated hydrogen.

In various embodiments, slurry catalysts used in embodiments described herein may have a particulate size of about 250 microns or less. In some embodiments, the slurry catalyst may have a particulate size of about 100 microns or less, or about 10 microns or less. In some embodiments, the minimum particulate size of the slurry catalyst may be about 1 micron.

In general, digestion in the hydrothermal digestion unit, if employed, may be conducted in a liquor phase. In some embodiments, the liquor phase may comprise a digestion solvent that comprises water. In some embodiments, the liquor phase may further comprise an organic solvent. Although any organic solvent that is at least partially miscible with water may be used as a digestion solvent, particularly suitable organic solvents are those that can be directly converted into fuel blends and other materials without being separated from the product mixture of the hydrothermal digestion. That is, particularly suitable organic solvents are those that may be co-processed along with the product mixture of the hydrothermal digestion into fuel blends and other materials during further processing reactions. Suitable organic solvents in this regard may include, for example, ethanol, ethylene glycol, propylene glycol, glycerol, and any combination thereof. In some embodiments, the organic solvent may comprise oxygenated intermediates produced from a catalytic reduction reaction of soluble carbohydrates. For example, in some embodiments, a digestion solvent may comprise oxygenated intermediates produced by a hydrogenolysis reaction or other catalytic reduction reaction of soluble carbohydrates. In some embodiments, the oxygenated intermediates may include those produced from an in situ catalytic reduction reaction and/or from the catalytic reduction reactor unit.

In some embodiments employing hydrothermal digestion, the digestion solvent may further comprise a small amount of a monohydric alcohol. The presence of at least some monohydric alcohols in the fluid phase digestion medium may desirably enhance the hydrothermal digestion and/or the catalytic reduction reactions being conducted therein. For example, inclusion of about 1% to about 5% by weight monohydric alcohols in the fluid phase digestion medium may desirably maintain catalyst activity due to a surface cleaning effect. Monohydric alcohols present in the digestion solvent may arise from any source. In some embodiments, the monohydric alcohols may be formed via the in situ catalytic reduction reaction process being conducted therein. In some or other embodiments, the monohydric alcohols may be formed during further chemical transformations of the initially formed product mixture of the hydrothermal digestion. In still other embodiments, the monohydric alcohols may be sourced from an external feed that is in flow communication with the cellulosic biomass solids.

In some embodiments, the digestion solvent may comprise between about 1% water and about 99% water. Although higher percentages of water may be more favorable from an environmental standpoint, higher quantities of organic solvent may more effectively promote hydrothermal digestion due to the organic solvent's greater propensity to solubilize carbohydrates and promote catalytic reduction of the soluble carbohydrates. In some embodiments, the digestion solvent may comprise about 90% or less water by weight. In other embodiments, the digestion solvent may comprise about 80% or less water by weight, or about 70% or less water by weight, or about 60% or less water by weight, or about 50% or less water by weight, or about 40% or less water by weight, or about 30% or less water by weight, or about 20% or less water by weight, or about 10% or less water by weight, or about 5% or less water by weight.

In some embodiments, the digestion solvent may comprise an organic solvent comprising oxygenated intermediates resulting from a catalytic reduction reaction of soluble carbohydrates. The catalytic reduction reaction may take place in the hydrothermal digestion unit and/or in the catalytic reduction reactor unit. In some embodiments, the organic solvent may comprise at least one alcohol, ketone, or polyol. In alternative embodiments, the digestion solvent may be at least partially supplied from an external source. For example, in some embodiments, bio-ethanol may be used to supplement the organic solvent. Other water-miscible organic solvents may be used as well. In some embodiments, the digestion solvent may be separated, stored, or selectively injected into the hydrothermal digestion unit to maintain a desired concentration of soluble carbohydrates or to provide temperature regulation in the hydrothermal digestion unit.

In various embodiments, digestion may take place over a period of time at elevated temperatures and pressures. In some embodiments, digestion may take place at a temperature ranging between about 100 to about 240 degrees C. for a period of time. In some embodiments, the period of time may range of about 0.25 to 24 hours. In some embodiments, the digestion to produce soluble carbohydrates may occur at a pressure ranging between about 1 bar (absolute) and about 100 bar. In general, the higher the temperature, the shorter the amount of time needed for hydrothermal digestion steps to take place. As an example, hydrothermal digestion may take place for about 1 hour to about 10 hours at a temperature of about 180 to about 270 degrees C., most typically from about 190 to 250 degrees C.

In various embodiments, suitable biomass digestion techniques may include, for example, acid digestion, alkaline digestion, enzymatic digestion, and digestion using hot-compressed water. In some embodiments, the methods may further comprise withdrawing at least a portion of the reaction product from the biomass conversion system (e.g., from the outlet of the catalytic reduction reactor unit or from the fluid circulation loop). In some embodiments, the methods may further comprise converting the reaction product into a biofuel, as described in further detail hereinafter. In some embodiments, the methods may further comprise separating solids (e.g., slurry catalyst, biomass fines, and the like) from the reaction product after its withdrawal from the biomass conversion system, as described above.

In some embodiments, the methods may further comprise recirculating at least a portion of the liquor phase from the catalytic reduction reactor unit to the hydrothermal digestion unit. As set forth above, the biomass conversion systems described herein are particularly suitable in being capable of rapidly at least partially transforming soluble carbohydrates into a reaction product comprising oxygenated intermediates by performing an in situ catalytic reduction reaction in the hydrothermal digestion unit. As also noted above, the liquor phase containing the reaction product may be recirculated from the catalytic reduction reactor unit to the hydrothermal digestion unit, where the liquor phase may, for example, help regulate temperature therein, serve as a digestion solvent, and the like. Recirculation from the catalytic reduction reactor unit to the hydrothermal digestion unit may take place at various recycle ratios. As used herein, the term "recycle ratio" refers to the amount of liquor phase that is recirculated to the hydrothermal digestion unit (e.g., within the fluid circulation loop) relative to the amount of liquor phase that is withdrawn from the biomass conversion system (e.g., by a reaction product takeoff line).

In some embodiments, the catalytic reduction reactions carried out may be hydrogenolysis reactions. In some embodiments, the catalytic reduction reaction may take place at a temperature ranging between about 110° C. and about 300° C., or between about 170° C. and about 300° C., or between about 180° C. and about 290° C., or between about 150° C. and about 250° C. In some embodiments, the catalytic reduction reaction may take place at a pH ranging between about 7 and about 13, or between about 10 and about 12. In other embodiments, the catalytic reduction reaction may take place under acidic conditions, such as at a pH of about 5 to about 7. Acids, bases, and buffers may be introduced as necessary to achieve a desired pH level. In some embodiments, the catalytic reduction reaction may be conducted under a hydrogen partial pressure ranging between about 1 bar (absolute) and about 150 bar, or between about 15 bar and about 140 bar, or between about 30 bar and about 130 bar, or between about 50 bar and about 110 bar.

In some embodiments, catalysts capable of activating molecular hydrogen and conducting a catalytic reduction reaction may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst capable of activating molecular hydrogen may be deposited on a catalyst support that is not itself catalytically active.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), amino acids derived from proteins present in biomass feedstock 11 and the like. In some embodiments, the slurry catalyst may be concentrated in the fluid phase after sulfiding, and the concentrated slurry may then be distributed in the cellulosic biomass solids using fluid flow. Illustrative techniques for catalyst sulfiding that may be used in conjunction with the methods described herein are described in U.S. application Ser. No. 12/407,479 (U.S. Application Publication No. 20100236988), filed on Mar. 19, 2009 and incorporated herein by reference in its entirety.

In some embodiments, as mentioned above, product mixture 13 and/or hydrocatalytically treated mixture 18, preferably as overhead fraction 15, and/or overhead product 118 (each or any combination may be referred to as "products subject to further processing") may be further processed into a biofuel. Further processing of products subject to further processing into a biofuel or other material may comprise any combination and sequence of further hydrogenolysis reactions and/or hydrogenation reactions, condensation reactions, isomerization reactions, oligomerization reactions, hydrotreating reactions, alkylation reactions, dehydration reactions, desulfurization reactions, and the like. The subsequent further processing reactions may be catalytic or non-catalytic. In some embodiments, an initial operation of downstream further processing may comprise a condensation reaction, often conducted in the presence of a condensation catalyst, in which products subject to further processing and/or a product derived therefrom is condensed with another molecule to form a higher molecular weight compound. As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art. Additional disclosure regarding condensation reactions and catalysts suitable for promoting condensation reactions is provided hereinbelow.

In some embodiments, methods described herein may further comprise performing a condensation reaction on products subject to further processing and/or a product derived therefrom. In various embodiments, the condensation reaction may take place at a temperature ranging from about 5 to 500 degrees C. The condensation reaction may take place in a condensed phase (e.g., a liquor phase) or in a vapor phase. For condensation reactions taking place in a vapor phase, the temperature may range from about 75 to 500 degrees C., or from about 500 degrees C. or from about 125 to 450 degrees C. For condensation reactions taking place in a condensed phase, the temperature may range from about 5 to about 475 degrees C., or from about 15 to 300 degrees C., or from about 20 to 250 degrees C.

In various embodiments, the higher molecular weight compound produced by the condensation reaction may comprise $\geq C_4$ hydrocarbons. In some or other embodiments, the higher molecular weight compound produced by the condensation reaction may comprise $\geq C_6$ hydrocarbons. In some embodiments, the higher molecular weight compound produced by the condensation reaction may comprise $C_4$-$C_{30}$ hydrocarbons. In some embodiments, the higher molecular weight compound produced by the condensation reaction may comprise $C_6$-$C_{30}$ hydrocarbons. In still other embodiments, the higher molecular weight compound produced by the condensation reaction may comprise $C_4$-$C_{24}$ hydrocarbons, or $C_6$-$C_{24}$ hydrocarbons, or $C_4$-$C_{18}$ hydrocarbons, or $C_6$-$C_{18}$ hydrocarbons, or $C_4$-$C_{12}$ hydrocarbons, or $C_6$-$C_{12}$ hydrocarbons. As used herein, the term "hydrocarbons" refers to compounds containing both carbon and hydrogen without reference to other elements that may be present. Thus, heteroatom-substituted compounds are also described herein by the term "hydrocarbons."

The particular composition of the higher molecular weight compound produced by the condensation reaction may vary depending on the catalyst(s) and temperatures used for both the catalytic reduction reaction and the condensation reaction, as well as other parameters such as pressure. For example, in some embodiments, the product of the condensation reaction may comprise $\geq C_4$ alcohols and/or ketones that are produced concurrently with or in lieu of $\geq C_4$ hydrocarbons. In some embodiments, the $\geq C_4$ hydrocarbons produced by the condensation reaction may contain various olefins in addition to alkanes of various sizes, typically branched alkanes. In still other embodiments, the $\geq C_4$ hydrocarbons produced by the condensation reaction may also comprise cyclic hydrocarbons and/or aromatic compounds. In some embodiments, the higher molecular weight compound produced by the condensation reaction may be further subjected to a catalytic reduction reaction to transform a carbonyl functionality therein to an alcohol and/or a hydrocarbon and to convert olefins into alkanes.

Exemplary compounds that may be produced by a condensation reaction include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various $\geq C_4$ alkanes and $\geq C_4$ alkenes that may be produced by the condensation reaction include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethylhexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $\geq C_5$ cycloalkanes and $\geq C_5$ cycloalkenes may have from 5 to about 30 carbon atoms and may be unsubstituted, mono-substituted or multi-substituted. In the case of mono-substituted and multi-substituted compounds, the substituted group may include a branched $\geq C_3$ alkyl, a straight chain ≥$C_1$ alkyl, a branched ≥$C_3$ alkylene, a straight chain ≥$C_1$ alkylene, a straight chain ≥$C_2$ alkylene, an aryl group, or a combination thereof. In some embodiments, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet other embodiments, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of ≥$C_5$ cycloalkanes and ≥$C_5$ cycloalkenes that may be produced by the condensation reaction include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

The moderate fractions of the condensation reaction, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The ≥$C_4$ compounds may also find use as industrial chemicals, whether as an intermediate or an end product. For example, the aryl compounds toluene, xylene, ethylbenzene, para-xylene, meta-xylene, and ortho-xylene may find use as chemical intermediates for the production of plastics and other products. Meanwhile, $C_9$ aromatic compounds and fused aryl compounds, such as naphthalene, anthracene, tetrahydronaphthalene, and decahydronaphthalene, may find use as solvents or additives in industrial processes.

In some embodiments, a single catalyst may mediate the transformation of product mixture 13 and/or hydrocatalytically treated mixture 18, preferably as overhead fraction 15, and/or overhead product 118 into a form suitable for undergoing a condensation reaction as well as mediating the condensation reaction itself. In other embodiments, a first catalyst may be used to mediate the transformation of products subject to further processing into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows.

In some embodiments, a single catalyst may be used to form a higher molecular weight compound via a condensation reaction. Without being bound by any theory or mechanism, it is believed that such catalysts may mediate an initial dehydrogenation of products subject to further processing followed by a condensation reaction of the dehydrogenated alcoholic component. Zeolite catalysts are one type of catalyst suitable for directly converting alcohols to condensation products in such a manner. A particularly suitable zeolite catalyst in this regard may be ZSM-5, although other zeolite catalysts may also be suitable.

In some embodiments, two catalysts may be used to form a higher molecular weight compound via a condensation reaction. Without being bound by any theory or mechanism, it is believed that the first catalyst may mediate an initial dehydrogenation of products subject to further processing, and the second catalyst may mediate a condensation reaction of the dehydrogenated products subject to further processing. Like the single-catalyst embodiments discussed previously above, in some embodiments, zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired.

In some embodiments, the condensation catalyst may comprise a basic catalyst comprising Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In some embodiments, the basic catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In some embodiments, the basic catalyst may comprise a mixed-oxide basic catalyst. Suitable mixed-oxide basic catalysts may comprise, for example, Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combination thereof. In some embodiments, the condensation catalyst may further include a metal or alloys comprising metals such as, for example, Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Use of metals in the condensation catalyst may be desirable when a dehydrogenation reaction is to be carried out in concert with the condensation reaction. Basic resins may include resins that exhibit basic functionality. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a hydrotalcite material derived from a combination of MgO and $Al_2O_3$. In some embodiments, the condensation catalyst may comprise a zinc aluminate spinel formed from a combination of ZnO and $Al_2O_3$. In still other embodiments, the condensation catalyst may comprise a combination of ZnO, $Al_2O_3$, and CuO. Each of these materials may also contain an additional metal or alloy, including those more generally referenced above for basic condensation catalysts. In more particular embodiments, the additional metal or alloy may comprise a Group 10 metal such Pd, Pt, or any combination thereof.

In some embodiments, the condensation catalyst may comprise a basic catalyst comprising a metal oxide containing, for example, Cu, Ni, Zn, V, Zr, or any mixture thereof. In some or other embodiments, the condensation catalyst may comprise a zinc aluminate containing, for example, Pt, Pd, Cu, Ni, or any mixture thereof.

In some embodiments, the condensation catalyst may comprise a multi-functional catalyst having both an acidic functionality and a basic functionality. Such condensation catalysts may comprise a hydrotalcite, a zinc-aluminate, a phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the multi-functional catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and any combination thereof. In some embodiments, the multi-functional catalyst may include a metal such as, for example, Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a metal oxide containing Pd, Pt, Cu or Ni. In still other embodiments, the condensation catalyst may comprise an aluminate or a zirconium metal oxide containing Mg and Cu, Pt, Pd or Ni. In still other embodiments, a multi-functional catalyst may comprise a hydroxyapatite (HAP) combined with one or more of the above metals.

In some embodiments, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reaction.

In some embodiments, an acid catalyst may be used to optionally dehydrate at least a portion of the reaction product. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in a fluid.

Various operations may optionally be performed on products subject to further processing prior to conducting a condensation reaction. In addition, various operations may optionally be performed on a fluid phase containing products subject to further processing, thereby further transforming them or placing them in a form more suitable for taking part in a condensation reaction. These optional operations are now described in more detail below.

As described above, one or more liquid phases may be present when digesting cellulosic biomass solids. Particularly when cellulosic biomass solids are fed continuously or semi-continuously to the hydrothermal digestion unit, digestion of the cellulosic biomass solids may produce multiple liquid phases in the hydrothermal digestion unit. The liquid phases may be immiscible with one another, or they may be at least partially miscible with one another. In some embodiments, the one or more liquid phases contained in products subject to further processing may comprise a phenolics liquid phase comprising lignin or a product formed therefrom, an aqueous phase comprising an alcoholic component, a light organics phase, or any combination thereof.

In some embodiments, heating of biomass feedstock 11 and the fluid phase digestion medium to form soluble carbohydrates and a phenolics liquid phase may take place while biomass feedstock 11 is in a pressurized state. As used herein, the term "pressurized state" refers to a pressure that is greater than atmospheric pressure (1 bar). Heating a fluid phase digestion medium in a pressurized state may allow the normal boiling point of the digestion solvent to be exceeded, thereby allowing the rate of hydrothermal digestion to be increased relative to lower temperature digestion processes. In some embodiments, heating biomass feedstock 11 and the fluid phase digestion medium may take place at a pressure of at least about 30 bar. In some embodiments, heating biomass feedstock 11 and the fluid phase digestion medium may take place at a pressure of at least about 60 bar, or at a pressure of at least about 90 bar. In some embodiments, heating biomass feedstock 11 and the fluid phase digestion medium may take place at a pressure ranging between about 30 bar and about 430 bar. In some embodiments, heating biomass feedstock 11 and the fluid phase digestion medium may take place at a pressure ranging between about 50 bar and about 330 bar, or at a pressure ranging between about 70 bar and about 130 bar, or at a pressure ranging between about 30 bar and about 130 bar.

To facilitate a better understanding of the present invention, the following examples of preferred embodiments are given. In no way should the following examples be read to limit, or to define, the scope of the invention.

EXAMPLES

To facilitate a better understanding of the present invention, the following examples of preferred embodiments are given. In no way should the following examples be read to limit, or to define, the scope of the invention.

Example 1

A 100-ml Parr reactor was charged with 60.18 grams of deionized water solvent, and 0.754 grams of nickel-oxide promoted cobalt molybdate catalyst (DC-2534, containing 1-10% cobalt oxide and molybdenum trioxide (up to 30 wt %) on alumina, and less than 2% nickel), obtained from Criterion Catalyst & Technologies L.P. The catalyst was sulfided by the method described in Example 5 of U.S. Application Publication No. 2010/0236988. The reactor was charged with about 5.05 grams of southern pine mini-chips (39% moisture, having a nominal size of about 3 mm×5 mm×5 mm in dimension), and about 0.195 grams of potassium carbonate buffer, before pressuring with 54 bar of hydrogen under magnetic stirring. The stirred reactor was heated to 190° C. for 1 hour. Subsequently, the reactor was heated to 250° C. for 5 hours, which was the end of a cycle. A sample of about 1-2 grams of mixed product was removed via a 0.5 micron sintered metal dip tube at the end of the cycle, while the reactor was still at reaction temperature and stirred. At the end of a cycle, the reactor was cooled, depressurized, and opened for additional wood to be added. Wood addition for cycles 2 through 5 entailed addition of 4.91, 5.09, 5.84, and 5.59 grams of wood. For cycle 6, 2.5 grams of glycerol were added to assess kinetics. For cycle 7, 5.9 grams of nominal 39% moisture ground pine chips were added. For cycle 8, 6.5 grams of pine chips were added. Following the addition of material (wood or glycerol) at the beginning of each cycle, the reactor was repressurized with hydrogen, and again reheated to initiate another cycle. After eight cycles of adding wood or glycerol, the 0.5 micron sintered metal dip tube plugged, and it was not possible to sample the mixed reaction phases. The mixture from the reactant was cooled down and a bottom fraction was separated by liquid-liquid separation. The bottom fraction exhibited a viscosity of greater than about 10,000 cP, measured via timing and flow on an inclined plane while reheating to about 110 degrees C.

The bottom fraction was analyzed by gas chromatography ("DB5-ox method") via dissolving the sample in excess acetone solvent using a 60-m×0.32 mm ID DB-5 column of 1 μm thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and the detector temperature was set at 300° C. Analysis revealed the presence of components with a boiling point greater than that of n-butanol, and the bottom fraction included methoxypropyl phenol and tetrahydrofurfuryl alcohol. The total weight percent of species detected in the bottom fraction was less than 100%, indicating the presence of higher molecular weight oligomers which could not elute from the heated GC injector.

Example 1 shows separation of a bottom fraction containing a lignin-derived phase from a top fraction liquid phase, where the bottom fraction contains phenolics and other heavy oligomers. This bottom fraction can be flashed according to embodiments of the invention.

Example 2

Example 1 was repeated with 60.06 grams of 25% ethanol in water as solvent, and 0.749 grams of sulfided cobalt molybdate catalyst. The reactor was pressurized to 52 bar with hydrogen, and heated to 190° C. for 1 hour, then to 250° C. for 3 hours, and subsequently to 270° C. for 2 hours. After 8 cycles of adding 6 grams of wood for each cycle as described above in Example 1, formation of a viscous phase on reactor internals was observed. The viscous phase exhibited a viscosity greater than 1000 cP at room temperature. This phase was separated using liquid-liquid separation to generate a bottom fraction. Analysis of this heavy bottoms fraction again revealed the presence of compounds with a boiling point that is higher than that of n-butanol, including tetrahydrofurfuryl alcohol and methoxypropyl phenol and propyl phenol. The total weight percent of species detected in the bottom fraction was less than 100%, indicating the presence of higher molecular weight oligomers which could not elute from the heated GC injector. Example 2 also shows the formation of a heavy phase which can be separated from a main reaction mixture by gravity settling, and which can be flashed according to embodiments of the invention.

Example 3

Example 1 was repeated with 50% ethanol in water as solvent. A heavy viscous phase coating internals and the bottom of the reactor was observed after 10 cycles of adding wood chips as described above in Example 1, with viscosity greater than 10,000 cP. Wood additions comprised 6.05, 6.06, 6.06, 6.06, 6.01, 6.00, 6.01, 6.02, 6.06, and 6.06 for completion of ten cycles. After the 10 cycles, the reactor was subjected to 5 hours of treatment under 52 bar of $H_2$ at 290° C., upon which the viscosity of the lower layer was reduced to less than about 500 cP. The high temperature hydrogen treatment led to increased formation of methoxy and alkyl phenols, such that the observed weight percent of compounds in the GC was more than 3-fold higher than for the similar phase formed in Example 2. The treated phase can be distilled to remove the components of lower volatility that can elute from a GC injector. The remaining bottom fraction containing heavy components, which comprise the unseen weight percent in the GC analysis, can be routed to a recovery unit for flashing and eventual combustion of remaining components according to embodiments of the invention.

Example 4

A 100-ml Parr reactor was charged with a solvent mixture comprising 29.3 grams of 1,2-propylene glycol, 3.3 grams of ethylene glycol, and 32.5 grams of deionized water. 0.75 grams of nickel-oxide promoted cobalt molybdate catalyst were added (DC-2534, containing 1-10% cobalt oxide and molybdenum trioxide (up to 30 wt %) on alumina, and less than 2% nickel), obtained from Criterion Catalyst & Technologies L.P., and sulfided by the method described in US2010/0236988 Example 5.

The reactor was charged with 6.1 grams of southern pine mini-chips (39% moisture), of nominal size 3×5×5 mm in dimension, before pressuring with 53 bar of hydrogen. The stirred reactor was heated to 190° C. for 1 hour, and subsequently heated to 250° C. for 5 hours to complete a cycle as described above in Example 1.

At the end of each cycle, 5.4 grams of product were withdrawn via a pipette. 6.0 grams of wood were charged to initiate a second reaction cycle using the protocol described in Example 1, along with 0.05 to 0.15 grams of buffer as needed to maintain pH between 5 and 6. Reactor product after each cycle was analyzed by gas chromatography using a 60-m×0.32 mm ID DB-5 column of 1 μm thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and the detector temperature was set at 300° C. The reaction sequence was continued through 45 cycles. At the end of cycle 45, 19.1262 grams of aqueous phase were decanted from the viscous heavy components phase. The remaining viscous heavy components phase can be flashed according to embodiments of the invention.

A distillation of the aqueous layer was conducted at ambient pressure under N2 blanket, using a 50-ml micro flask with short-path distillation head. The distillation was continued until 58% of the initial still contents were collected as overhead distillate. A first distillation cut was taken as bottoms temperature increased from 120 to 168 degrees C. A second distillation cut was taken at bottoms temperatures between 169 and 186 degrees C. The atmospheric distillation was terminated at 196.9 degrees C. bottoms temperature, and gave a fraction comprising diols and acids.

The distillation of this fraction was resumed under vacuum at a nominal pressure of 10 Torr. A maximum temperature of 279 degrees C. was obtained, and 32% of the heavy ends from vacuum distillation were recovered as overhead distillate. The resulting bottom fraction from vacuum distillation was dissolved in dichloromethane and analyzed by GC MS. Many components were too heavy to analyze. Overall structures resembled asphaltenes, with some phenolic groups present.

The distillation bottoms flask was unwrapped and tipped sideways to demonstrate flow of heavy residue at a bottoms temperature of about 268 degrees C., at an estimated viscosity in excess of 1000 cP. About 82% of the final residue could be poured out of the hot flask. Upon cooling, the residue would not flow and required removal by spatula for sampling.

This example shows thermal distillation of intermediate production from digestion-reaction of wood biomass using a catalyst capable of activating molecular hydrogen, under a hydrogen atmosphere. Mono- and di-oxygenates which can be coupled via condensation-oligomerization reactions could be separated by distillation at atmospheric pressure and under vacuum, leaving a heavy tar-like residue. The heavy residue could be kept molten to flow out of distillation kettle when heated above 250 degrees C. This bottom fraction from vacuum distillation containing heavy residues can be flashed according to embodiments of the present invention. Alternatively, the temperature of the atmospheric distillation can be increased to produce a bottom fraction that may be routed to a recovery unit for flashing and eventual combustion of remaining components according to embodiments of the present invention.

Example 5

Example 4 was repeated using 4-methyl-2-pentanol (methyl isobutyl carbinol or "MIBC") as the digestion medium, and with use of larger scale batches were run conducted in a 450 mL Parr reactor. The reactor was initially charged with 220.06 g of MIBC, 25.08 g deionized water, 0.855 g of potassium carbonate buffer, and 8.1065 g of sulfided cobalt-molybdate catalyst as described in Example 1. For each reaction cycle, 27 g of softwood pine mini-chips were added, and an equivalent amount of liquid sample was removed at the end of each cycle. For liquid sample removal after each cycle, a portion of the lower aqueous layer was removed from as liquid above the settled catalyst layer, if present, followed by removal of a sufficient amount of the upper layer if required to maintain the liquid inventory in the reactor at a 60% level. After 17 cycles, a sample of the upper layer was distilled at atmospheric pressure under nitrogen, followed by vacuum distillation at 10 Torr. Distillate cut number 2 was collected under nitrogen at atmospheric pressure with a kettle bottoms temperature of about 110 to 140 degrees C. and an overheads temperature of about 90 degrees C. Cut number 2 contains a mixture of oxygenated and alkane intermediates. With a kettle temperature of about 258 to 302 degrees C., a vacuum distillation cut containing an estimated 30% of the reactor product was obtained as distillate cut number 6. In addition to alcohols (including glycols and other diols), significant quantities of phenolic compounds were obtained in cut number 6. For example, methoxy propyl phenol was found to be present in quantities greater than 4%. Tetrahydrofurfural alcohol was also found as a significant reaction product. No observable viscous layer or tar was formed under the experimental conditions of Example 5. A final vacuum distillation cut representing the end point of distillation (final 1% of feed) is produced and reported in Table 1 below.

TABLE 1

Final vacuum distillation cut at 348 degrees C. bottom temperature

| Name | area % |
|---|---|
| acetone (diluent) | N/A |
| 1-butanol (internal standard) | N/A |
| 4-methyl-2-Pentanol | N/A |
| tetrahydro Furanmethanol | 3.27% |
| phenol | 6.93% |
| methoxy phenol | 8.61% |
| methyl phenol | 12.39% |
| unknown | 3.89% |
| dimethy phenol | 7.37% |
| methyl methoxy phenol | 6.27% |
| ethyl phenol | 6.15% |
| methyl ethyl phenol | 5.51% |
| unknown | 2.58% |
| ethyl methoxy phenol | 5.24% |
| unknown | 3.76% |
| propyl phenol | 6.09% |
| unknown | 0.91% |
| benzene diol | 5.24% |
| propyl methoxy phenol | 6.30% |
| unknown | 1.15% |
| unknown | 2.50% |
| unknown | 5.84% |

The distillation flask bottoms after distillation with a final temperature of about 345 degrees C. continued to boil and bubble, but formed a solid char with resemblance to coal, upon cooling to room temperature. This example shows digestion and reaction intermediates. Distillation allows removal of monooxygenates and diols, with some phenols. Some heavy tar components with separation points in excess of 350 degrees C. remain in the bottoms, and for a char phase upon cooling. At least one of distillation cut number 6, the final vacuum distillation cut, and the heavy tar components remaining in the bottoms can be flashed according to embodiments of the invention.

Example 6

Example 5 was repeated with 34 cycles of wood addition. Distillation was conducted at atmospheric pressure under $N_2$ to remove 85% of the reactor contents as overhead product, analyzed as a mixture of monooxygenates and some diols. The remaining 15% kettle bottoms formed a non-flowable viscous tar at room temperature, for which dissolution in acetone solvent required reheating. The remaining 15% kettle bottoms can be flashed according to embodiments of the invention.

The particular embodiments disclosed above are illustrative only, as embodiments of the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

We claim:

1. A system comprising:
a digestion unit adapted to digest a cellulosic biomass material to generate a digested product;
a separation zone adapted to separate the digested product into at least an overhead fraction and a bottom fraction; wherein the bottom fraction comprises (i) at least one compound having a separation point having a temperature in a range of about 100 to 600 degrees C. and a pressure of about atmospheric pressure, and (ii) one or more volatile organic compounds; and
a recovery unit comprising a first flasher coupled to the separation zone to receive at least a portion of the bottom fraction during operation of the first flasher;
and a second flasher coupled to the separation zone to receive at least a portion of the bottom fraction during operation of the second flasher;
wherein the recovery unit is configured to operate one of the first and second flashers to vaporize at least one volatile organic compound in the bottom fraction while the other flasher is in standby mode.

2. The system of claim 1 further comprising a further processing zone coupled to the separation zone, the further processing zone is configured to convert at least a portion of a plurality of hydrocarbon and oxygenated hydrocarbon molecules in the overhead fraction from the separation zone to a product stream comprising a higher hydrocarbon.

3. The system of claim 2 wherein an outlet of the recovery unit adapted to discharge at least a portion of the overhead product is coupled to an inlet of the processing zone.

4. The system of claim 1 further comprising a heating component adapted to heat at least a portion of the bottom fraction prior to the bottom fraction entering the flasher in operation.

5. The system of claim 1 wherein at least one flasher comprises a conduit adapted to circulate a heat exchange medium.

6. The system of claim 1 wherein the bottom fraction comprises a compound having a separation point having a temperature in a range of about 100 to 500 degrees C. and a pressure in a range of about 1 to 100 Torr.

7. The system of claim 1 wherein the flasher in operation is adapted to apply a temperature in a range of about 100 to 600 degrees C. and a pressure in a range of 0.01 to 250 psi to the bottom fraction.

8. The system of claim 1 wherein the bottom fraction comprises at least one of lignin, a lignin-derived compound, unextracted cellulose, unextracted hemicellulose, a caramelan, and any combination thereof.

9. The system of claim 1 further comprising a third flasher coupled to the separation zone to receive at least another portion of the bottom fraction.

10. The system of claim 1 wherein at least one of the first and second flashers comprises at least one packer element.

11. The system of claim 1 wherein each of the first and second flashers is adapted to combust a compound from the bottom fraction deposited on a surface in the flasher to generate thermal energy.

12. A method comprising:
providing a biomass feedstock containing cellulose and water;
digesting at least a portion of the biomass feedstock to generate a digested product;
separating the digested product into at least an overhead fraction and a bottom fraction, wherein the bottom fraction comprises (i) at least one compound having a separation point having a temperature in a range of about 100 to 600 degrees C. and a pressure of about atmospheric pressure selected, and (ii) one or more volatile organic compounds;
vaporizing at least one volatile organic compound from the bottom fraction in a first flasher to generate an overhead product;
depositing the at least one compound having a separation point having a temperature in a range of about 100 to 600 degrees C. and a pressure of about atmospheric pressure on a surface in the first flasher;
placing the first flasher in standby mode;
vaporizing at least one volatile organic compound from the bottom fraction in a second flasher to generate additional overhead product; and
combusting the deposited at least one compound in the first flasher.

13. The method of claim 12 further comprising converting at least a portion of a plurality of hydrocarbon and oxygenated hydrocarbon molecules in the overhead fraction from the separating step to a product stream comprising a higher hydrocarbon.

14. The method of claim 13 wherein the overhead product from at least one vaporization step comprises a plurality of oxygenated hydrocarbon molecules.

15. The method of claim 14 further comprising converting at least a portion of the oxygenated hydrocarbon molecules in the overhead product from at least one vaporization step to a product stream comprising a higher hydrocarbon.

16. The method of claim 12 wherein the vaporizing step comprises applying a temperature in a range of 100 to 600 degrees C. and a pressure in a range of 0.01 to 250 psi to the bottom fraction.

17. The method of claim 12 wherein said surface of the first flasher comprises a surface of a packer element disposed in the first flasher.

18. The method of claim 12 further comprising providing thermal energy from combustion of the deposited at least one compound in the first flasher to at least a portion of the bottom fraction prior to the bottom fraction entering the flasher in operation.

* * * * *